United States Patent
Dragulinescu

(10) Patent No.: US 11,981,067 B2
(45) Date of Patent: May 14, 2024

(54) MULTI-CAVITY MOLD FOR A THERMOFORMING MACHINE USED IN THE PROCESS OF HIGH-VOLUME, CONTINUOUS THERMOFORMING OF THIN-GAUGE PLASTIC PRODUCTS

(71) Applicant: Ionel-Dan Dragulinescu, Campulung (RO)

(72) Inventor: Ionel-Dan Dragulinescu, Campulung (RO)

( * ) Notice: Subject to any disclaimer, the term of this patent is extended or adjusted under 35 U.S.C. 154(b) by 264 days.

(21) Appl. No.: 17/594,588

(22) PCT Filed: Apr. 24, 2019

(86) PCT No.: PCT/RO2019/000014
§ 371 (c)(1),
(2) Date: Oct. 22, 2021

(87) PCT Pub. No.: WO2020/218932
PCT Pub. Date: Oct. 29, 2020

(65) Prior Publication Data
US 2022/0212393 A1 Jul. 7, 2022

(51) Int. Cl.
| | | |
|---|---|---|
| B29C 51/32 | (2006.01) | |
| B29C 51/04 | (2006.01) | |
| B29C 51/26 | (2006.01) | |
| B26D 1/00 | (2006.01) | |
| B26F 1/44 | (2006.01) | |
| B29K 27/18 | (2006.01) | |

(52) U.S. Cl.
CPC ............ B29C 51/262 (2013.01); B29C 51/04 (2013.01); B29C 51/266 (2013.01); B29C 51/32 (2013.01);
(Continued)

(58) Field of Classification Search
CPC .... B29C 2043/3615; B29C 2043/3602; B29C 33/306; B29C 33/305; B29C 33/302;
(Continued)

(56) References Cited

U.S. PATENT DOCUMENTS 3,406,428 A * 10/1968 Brown .................... B29C 51/30
  425/351
3,612,346 A * 10/1971 Schneider ............... B29C 51/04
  206/519
(Continued)

FOREIGN PATENT DOCUMENTS

| CN | 105383049 A | 3/2016 |
| EP | 1142691 B | 5/2004 |

OTHER PUBLICATIONS

European Patent Office (EPO), International Search and Written Opinion dated Jan. 7, 2020 for PCT International Application No. PCT/RO2019/000014, international filing date Apr. 24, 2019, priority date Apr. 24, 2019.
(Continued)

*Primary Examiner* — Matthew J Daniels
(74) *Attorney, Agent, or Firm* — Law Office of Andrei D Popovici, PC

(57) ABSTRACT

A multi-cavity mould (1) for a thermoforming machine used in the process of high-volume, continuous thermoforming of a plurality of thin-gauge plastic products (2) from a preheated thin-gauge thermoplastic sheet (3) comprising an upper tool (11) and a lower tool (12) arranged in a cooperating manner; the lower tool (12) comprising a plurality of cavities (8) in which cavity moulds (8) are placed and a plurality of base plates (91) from which a plurality of supporting blocks (92) extend perpendicularly over a predetermined total height (a), situated between adjacent cavities (8), each of said supporting block (92) has a stepped profile comprising three substantially rectangular shaped zones (92a, 92b, 92c) and a fourth substantially isosceles trapezoid shaped zone (92d) in a vertical cross section, having a common symmetry axis.

15 Claims, 22 Drawing Sheets

(52) U.S. Cl.
CPC ............... *B26D 2001/0053* (2013.01); *B26F 2001/4472* (2013.01); *B29C 2793/0009* (2013.01); *B29C 2793/0054* (2013.01); *B29C 2793/0081* (2013.01); *B29K 2027/18* (2013.01)

(58) Field of Classification Search
CPC . B29C 33/301; B29C 33/0022; B29C 51/266; B29C 51/325; B29C 51/306; B29C 51/30; B29C 51/32
See application file for complete search history.

(56) References Cited

U.S. PATENT DOCUMENTS

| | | | | |
|---|---|---|---|---|
| 3,712,780 | A * | 1/1973 | Jope | B29C 51/30 |
| | | | | 264/153 |
| 4,161,382 | A * | 7/1979 | Padovani | B29C 51/32 |
| | | | | 425/304 |
| 5,135,381 | A * | 8/1992 | Evans | B29C 51/32 |
| | | | | 425/308 |
| 2010/0237543 | A1* | 9/2010 | Le Roi | B29C 33/02 |
| | | | | 264/509 |
| 2015/0353224 | A1 | 12/2015 | Naber | |

OTHER PUBLICATIONS

European Patent Office (EPO), International Search and Written Opinion dated Oct. 20, 2020 for PCT International Application No. PCT/RO2020/050004, international filing date Apr. 24, 2020, priority date Apr. 24, 2019.

* cited by examiner

MULTI-CAVITY MOLD FOR A THERMOFORMING MACHINE USED IN THE PROCESS OF HIGH-VOLUME, CONTINUOUS THERMOFORMING OF THIN-GAUGE PLASTIC PRODUCTS

FIELD OF THE INVENTION

The present invention relates to the field of machines which thermoform thin-gauge plastic sheet material into various parts and/or products and particularly to a multi-cavity mould included as a part of the thermoforming machine used in the process of high-volume, continuous thermoforming of thin-gauge plastic products, for example in the Form/Cut/Stack and/or In-Mould-Cut thermoforming machines with multi-cavity mould.

BACKGROUND OF THE INVENTION

The thermoforming process is widely used in the packaging industry to make various products from sheets (sometimes referred to as "films") of thermoplastic material, which is a substance (especially synthetic plastic or resin) becoming soft and moldable when subjected to heat and regaining its solid state when cooling, without appreciable change of properties.

The thermoforming process (also known as "thermoforming cycle") is a manufacturing process for thermoplastic sheet or film. Specifically, it is more of a converting process, where thermoplastic sheet or film is converted into a formed, finished part. The sheet or film is heated in an oven to its forming temperature, then stretched into or onto a mould, whose shape it takes and then cooled. Depending on the application, the thermoforming process uses thin-gauge or thick-gauge sheets of thermoplastic material. Thin-gauge films are used to manufacturing trays, containers, disposable cups, blisters, etc. They have wide applications in the food, fast moving consumer goods, and medical industries. The thin-gauge thermoplastic films are usually wrapped up on a reel of cardboard and have a thickness (A) between 0.2 and 2 mm. The known thermoplastic materials used are: Polypropylene (PP), Polyvinyl chloride (PVC), Polystyrene (PS), Oriented Polystyrene (OPS), Polyethylene terephthalate (PET), Poly(lactic acid) or polylactic acid or polylactide (PLA), Crystalline Polyethylene Terephthalate (CPET), various combinations like Polypropylene/Ethylene vinyl alcohol/Polypropylene (PP/EVOH/PP), Polypropylene/Polyethylene or polythene (PP/PE), Polyethylene terephthalate/Polyethylene or polythene (PET/PE) and the combinations thereof.

During the thermoforming process of thin-gauge plastic products, the thin-gauge thermoplastic film is fed through the thermoforming machine, either continuously from a roll or in cut sheets and is subsequently heated to allow forming of the plastic, shaped in moulds (which can be plug moulds or cavity moulds) to produce the shapes of the various desired parts or products, then cooled and trimmed to separate the parts/products from the surrounding scrap sheet/film (sometimes referred to as "web").

Thermoforming machines typically include:
- an oven or heating station, in which the thermoplastic sheet of material is heated to the forming temperature so that it may be stretched into or onto a mould;
- a forming station in which the heated plastic is formed into the desired shapes by mould portions which engage with one another;
- a trim or cutting station where the formed parts/products are cut or separated from the web and
- a stacker station where the separated parts/products resulting from the cutting station are stacked and transported to the packing station.

There are three known thermoforming methods, differing in the technique used for the forming stage: vacuum, pressure and mechanical thermoforming.

The known techniques used for the cutting or separation stage are:
- cutting/shearing usually by using a punch or moving blade and a die or fixed blade and
- die cutting by using a cutting head (usually a steel rule die i.e. a sharpened metal band used in compression cutting) and a press head (which serves as a surface against which the die performs the cutting operation). "Steel-rule dies", also known as "cookie cutter dies", are used for cutting sheets of softer materials, such as plastics. The cutting surface of the die is the edge of hardened steel strips, known as "steel rule". Depending on the die cutting operation, the press head is designed to accommodate or work in conjunction with the custom design of the steel rule die. Once the material enters the cutting station and is properly positioned beneath the cutting head, the cutting head begins a downward stroke which applies vertical pressure perpendicular to the plane of the material's surface. The movement and pressure cause the steel rule die to compress the material against the press head until the die's edge penetrates the material. This action produces the desired cuts or perforations on the material. The dies can use instead of steel rule dies also forged dies or CNC dies (i.e. Computer Numerical Control (CNC) tools used for cutting various hard materials, such as wood, composites, aluminum, steel, plastics, glass, and foams; tool paths are controlled via computer numerical control), which are known as solid dies. The main advantage of steel-rule dies is the low cost to make them, as compared to solid dies; however, they are not as robust as solid dies, so they are usually used for short production cycles.

Also, different thermoforming machines are known, which use the techniques mentioned above. The preferred thermoforming machines used in the process of high-volume, continuous thermoforming of thin-gauge plastic products are the Form/Cut/Stack and In-Mould-Cut thermoforming machines.

In the Form/Cut/Stack thermoforming machine, the forming and cutting operations are accomplished in separate stations, in different subassemblies of the thermoforming machine and the desired geometry is accomplished with or without the benefit of a mechanical plug assist (i.e. a mechanical device used to aid or assist sheet stretching prior to total contact with the mould).

In the In-Mould-Cut chain transport type thermoforming machine, the forming and cutting operations are accomplished in a single station. Desired geometry is accomplished with or without the benefit of a mechanical plug assist. The process begins by first holding the sheet of plastic material against a hardened cutting plate by means of the leading edge of the forged steel cutting die (or steel-rule cutting die) penetrating the surface of the plastic sheet. This contact provides the seal needed for the next step in the forming process, in case of In-Mould-Cut tools with CNC (forged) dies. In case of In-Mould-Cut tools with steel-rule dies, the seal is provided via a pressure box and O-rings used for sealing. Pressurized air, usually introduced through the hardened cutting plate, pushes the heated plastic sheet (preheated into the previous oven station) into the mould geometry, mounted inside the perimeter of the steel dies. After cooling, the steel die is pushed the rest of the way through the plastic material, into contact with the hardened cutting plate, and the part/product is cut. The part/product inside the web is ejected from the mould by means of pressurized air, spring assisted ejection rings, movable bottom ejectors, movable stripping plate or combinations thereof. It is then conveyed to the next station (usually a stacker station) inside the web. This is facilitated by tiny precise notches (also called "nicks") in the cutting edge of the die. These notches hold the plastic parts/products in the web while being conveyed, but are kept small enough so the parts/products can be easily separated from the web for packing.

The remaining portion of the sheet from which the parts/products have been cut—commonly known as "skeleton" or "web"—is waste material and is discarded, recycled or is sold as scrap plastic.

The In-Mould-Cut thermoforming technology available today is preferred because it has several advantages compared to the other known thermoforming technologies. This type of machines generally produces the least amount of trim waste/scrap plastic. For example, in a chain-type In-Mould-Cut thermoforming mould with CNC machined dies, this is primarily because the cutting die not only cuts on the part perimeter, but is also used to form the airtight perimeter seal needed to form the plastic product. Another advantage is that the plastic material/formed product is generally warm when it is trimmed. This is highly desirable when cutting PET, because warm plastic material/formed product requires dramatically less pressure to trim. These lower pressures usually extend the usefulness of the cutting edge of the die significantly. An additional advantage is the accuracy of trimming the part/product geometry. Today's modern thermoforming machines are achieving trim accuracy that approaches the precision found in match metal trim stations, at a significant cost savings. Finally, some thermoplastic materials allow for extremely short thermoforming cycle times, especially in geometries that feature shallow draw.

The plastic thermoforming moulds for a thermoforming machine usually comprise one pair of complementary tools in which: male (also known as "plug moulds" or "positive moulds") and female (also known as "cavity moulds" or "negative moulds") are provided. The cavity moulds are placed in cavities provided inside one of the molding tool's main body. The term "cavity", used in the thermoforming technical field, refers to an empty space or to a hole inside a main body of a molding tool where the cavity moulds are inserted. With male moulds, the thermoplastic sheet is formed over the surface of the male mould. With female moulds, the thermoplastic sheet is formed inside of the female mould's surface. Male moulds are used when the inside dimensions of the plastic part are a priority. Female moulds are used when the part's or product's outer dimensions are more important than its inner dimensions. A female mould can produce highly detailed parts/products. With female moulds, the inside of the mould surface usually produces the exterior surface of the finished parts/products. This supports the creation of sharp corners and molded-in features such as logos, ribbing, and recesses for name plates which is particularly important in the packaging industry. Depending on the part/product, the inside corners of a female mould may be relatively tight.

For the packaging industry, since a production quantity of several million or more products can be forecasted, the number of cavities of a mould is increased from one cavity to usually 12, 24 or even 64 cavities, thereby reducing the production costs per a single thermoforming cycle. Multi-cavity moulds can be extremely cost effective and can provide enormous capacity for the manufacturer; however, they come with some degree of risk. The tool design must be able to provide uniform processing conditions at each cavity and less plastic scrap or waste material at the end of a thermoforming production cycle.

Conventional thermoforming machines with multi-cavity mould produce two or more identical parts/products at one press stroke. The formed identical parts/products are then trimmed individually from the sheet of plastic material leaving a skeleton of scrap material which has to be discarded or recycled. This is due to the spaced-apart layout of the cavities inside a multi-cavity mould. Usually, the standard distance between adjacent cavity moulds is of 12-40 mm. This is due to the configuration of a supporting block (i.e. a metal block, typically of a rectangular shape, which extends perpendicularly from a base plate inside the main body of a mould, over a predetermined total height, situated between adjacent cavities). This supporting block has to confer increased rigidity to the tool's main block and to the cavity moulds, as well as high mechanical resistance during the thermoforming process at multiple press strokes. Therefore the standard minimum distance between adjacent cavity moulds is of 12 mm to ensure an increased rigidity and mechanical resistance of the supporting block. Thus, a considerable amount of unformed plastic material remains between the edges of the parts/products formed as well as between the edges of the parts/products formed and the surrounding plastic sheet margins. Also, the minimum distance between adjacent cavity moulds is of 12 mm to ensure adequate space for the configuration of the ventilation channels inside the mould; The ventilation channels are vent holes around the periphery of the cavity moulds and in areas requiring crisp detail; these channels are so small that they do not deform the plastic material which will line the cavity mould during moulding, but at the same time are large enough to permit the trapped air to escape from the cavity mould. Other reasons to maintain a minimum distance of 12 mm between adjacent cavity moulds are:

to allow for an easy transport of the formed/trimmed products by using the unformed plastic material between adjacent products (the formed and then trimmed thin-gauge plastic products remain attached to the thermoplastic sheet via tiny precise notches (also called "nicks") to be easily transported to the next station);

adequate space for cooling circuits (usually water cooling circuits) for the formed parts/products inside the cavity moulds; The cooling circuits are straight cooling channels within the mould, which serve to cool and harden the part/product in contact with the cavity mould;

to ensure an easy trimming of the formed parts/products inside the thermoplastic sheet (only on the top contour of the formed product).

The main disadvantage of the conventional thermoforming mould is that it generates a substantially large amount of scrap material that needs to be stored, discarded or recycled at additional cost. The scrap percentage is usually around 20% to 50%. Most thermoforming companies recycle their plastic scrap material. Frequently this is converted back into extruded sheet for forming again. This recycling process decreases the efficiency of the thermoforming process by increasing the production lead time of finished parts/products per m² of plastic sheet material. Another oft-forgotten fact about recycling is that the recovered material degrades in quality.

Another disadvantage of the conventional thermoforming mould is the higher maintenance costs for replacing the individual cutting dies. For example, if a single forged die is damaged, the entire set of forged dies must be sent out for sharpening, thereby increasing the set-up times and decreasing productivity. Also, the high force required to cut through the plastic sheet has to be well controlled to minimize what is called the "overshoot" of the moving die. Otherwise the forged dies will hit the counter plate too hard which will quickly damage the dies and degrade the quality of the cutting edges. Therefore, lowering the force required to cut through the plastic sheet will allow for a better control of the cutting die.

Also, in the conventional Form/Cut/Stack thermoforming mould, the auto-centering of the individual dies is based on additional centering features provided on the forming station, such as forming cones in an area where adjacent products are formed and/or an independent aligning system for dies provided on the cutting station. These additional centering features increase considerably the total production costs for the thermoforming moulds and the precision alignment capabilities of the thermoforming moulds are poor.

Efficient and cost-effective thermoforming machines with multi-cavity mould that address these conventional inefficiencies are therefore needed.

SUMMARY OF THE INVENTION

The present invention provides a solution to the above mentioned inherent problems associated with the known thermoforming machines with multi-cavity mould. The main objective technical problem is how to improve the efficiency of a thermoforming process while producing the most finished parts/products per m² of plastic sheet material and maintaining a reduced scrap rate.

The main purpose of the present invention is to remedy the above mentioned drawbacks of the prior art by disclosing a mufti-cavity mould for a thermoforming machine that can form and/or trim a series of parts/products in a row/a column or multiple rows/columns while eliminating all web between the edges of the parts/products and gaining extra 10% efficiency using the common-edge-cut tooling technology compared to the conventional thermoforming machines with multi-cavity mould.

This purpose is achieved in accordance with the invention having the characteristics of the independent claim 1.

Advantageous embodiments of the invention will appear from the dependent claims.

The multi-cavity mould of the invention for a thermoforming machine used in the process of high-volume, continuous thermoforming of a plurality of thin-gauge plastic products from a preheated thin-gauge thermoplastic sheet according to the independent claim 1 comprises:
an upper tool and a lower tool arranged in a cooperating manner; the lower tool comprising:
a plurality of cavities in which cavity moulds may be placed and
a plurality of base plates from which a plurality of supporting blocks extend perpendicularly over a predetermined total height, situated between adjacent cavities,
characterized in that
each of said supporting block has a stepped profile comprising a first, a second, a third substantially rectangular shaped zones in a vertical cross section and a substantially isosceles trapezoid shaped fourth zone in a vertical cross section, having a common symmetry axis in a vertical cross section through a plane perpendicular to said base plate wherein:
said first zone extends perpendicularly from said base plate over a distance calculated as 17-50% of the total height of said supporting block and the width of the first zone is calculated as 24-60% of the total height of said supporting block;
said second zone extends in continuation of said first zone over a distance calculated as 45-65% of the total height of said supporting block and the width of the second zone is calculated as 7-16% of the total height of said supporting block;
said third zone extends in continuation of said second zone over a distance calculated as 9-12% of the total height of said supporting block and the width of the third zone is calculated as 5-10% of the total height of said supporting block;
said substantially isosceles trapezoid shaped fourth zone extends in continuation of said third zone over a distance calculated as 9-12% of the total height of said supporting block, wherein the fourth zone has a bottom base in contact with and having the same width as the third zone, a top base and two legs of equal length between the top and bottom bases, and the width of the top base of said fourth zone is calculated as 2.5-5% of the total height of said supporting block.

DETAILED DESCRIPTION OF EMBODIMENTS OF THE INVENTION

In the following detailed description, reference is made to the accompanying drawings that form a part hereof, and which only have an illustrative, not limiting value.

Figure 1:
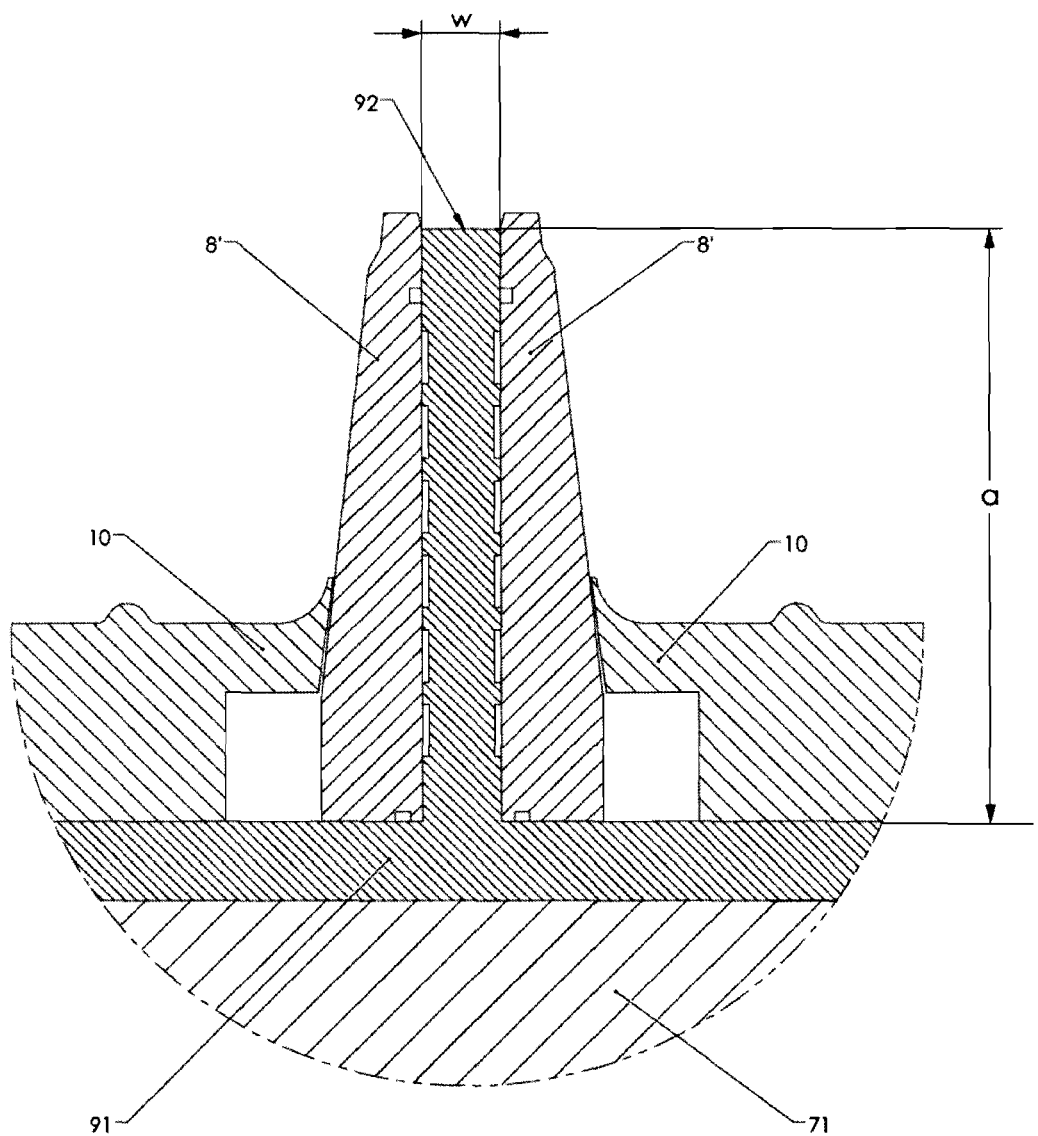
FIG. 1 depicts a detailed front view in a vertical cross section of a conventional supporting block of a multi-cavity mould.

A detailed front view in a vertical cross section of a conventional supporting block of a multi-cavity mould is shown in FIG. 1. The width (w) of the conventional supporting block, as shown in FIG. 1, is usually calculated as 20-25% of the total height (a) of the supporting block, thus complying with the technical considerations mentioned above.

However, the inherent problems mentioned above and associated with the known thermoforming machines with multi-cavity mould must be solved.

The inventive solution to the technical problems associated with the known thermoforming moulds, provided by the present invention, is to reconfigure the supporting block's structure and profile between adjacent cavities in order to reduce the distance between adjacent cavity moulds such that the formed products are joined only by a common-edge and then severed on this common-edge by a cutting die to obtain the finished thin-gauge plastic products. The inventive solution complies with the technical requirements regarding rigidity, adequate space for the cooling circuit and for the ventilation channels, easy trimming of the formed products and so on.

With reference to FIGS. 2 to 22, a multi-cavity mould (1) for a thermoforming machine used in the process of high-volume, continuous thermoforming of a plurality of thin-gauge plastic products (2) from a preheated thin-gauge thermoplastic sheet (3) according to the present invention is disclosed comprising an upper tool (11) and a lower tool (12) arranged in a cooperating manner to simultaneously form and/or sever a plurality of thin-gauge plastic products (2).

The lower tool (12) comprises a plurality of cavities (8) arranged in a x-z array, in which cavity moulds (8') may be placed. The lower tool (12) further comprises a plurality of base plates (91) from which a plurality of supporting blocks (92) extend perpendicularly over a predetermined total height (a), situated between adjacent cavities (8). Preferably, the base plates (91), the supporting blocks (92) and the cavity moulds (8') are made of an Aluminum alloy selected from a group consisting of 5083, 6082 or 7075 Aluminum alloys. These are known for their low density (the overall weight of a mould is therefore lower and can be easily transported), higher strength when compared to steel, relatively soft, ductile and easily workable under normal temperature. The tensile strength of these Aluminum alloys is higher than aluminum. The electrical and heat conductivity is less than that of pure aluminum and more than that of steel (the mould can have a relatively constant temperature in its entire groundmass). These can be easily forged, casted and worked with respect to their low melting point, especially on numerically controlled tools.

Each supporting block (92) has a stepped profile divided into four zones (92a, 92b, 92c, 92d). The first three zones, namely a first (92a), a second (92b) and a third (92c) zone are substantially rectangular shaped zones in a vertical cross section and the fourth zone (92d) has a substantially isosceles trapezoid shaped, in a vertical cross section. All of these four zones (92a, 92b, 92c, 92d) have a common symmetry axis in a vertical cross section through a plane perpendicular to the base plate (91). Also, the adjacent cavity moulds (8') have a stepped profile, on their exterior surface, which corresponds in a complementary manner to the profile of the supporting block (92) between them.

The first zone (92a) extends perpendicularly from the base plate (91) over a distance (a1), which represents the height of the first zone (92a), calculated as 17-50% of the total height (a) of the supporting block (92). The width of the first zone (92a) is calculated as 24-60% of the total height (a) of the supporting block (92).

The second zone (92b) extends in continuation of the first zone (92a) over a distance (a2), which represents the height of the second zone (92b), calculated as 45-65% of the total height (a) of the supporting block (92). The width of the second zone (92b) is calculated as 7-16% of the total height (a) of the supporting block (92).

The third zone (92c) extends in continuation of the second zone (92b) over a distance (a3), which represents the height of the third zone (92c), calculated as 9-12% of the total height (a) of the supporting block (92). The width of the third zone (92c) is calculated as 5-10% of the total height (a) of the supporting block (92).

The fourth zone (92d) has a substantially isosceles trapezoid shape and extends in continuation of said third zone (92c) over a distance (a4), which represents the height of the fourth zone (92d), calculated as 9-12% of the total height (a) of the supporting block (92).

The term "isosceles trapezoid shape" can be defined as a trapezoid with two bases (i.e. parallel sides), in which both legs (i.e. non-parallel sides) have the same length; the base angles have the same measure pair wise and the trapezoid has a line of symmetry through the midpoints of opposite sides. The segment that joins the midpoints of the parallel sides (i.e. top base and bottom base) is perpendicular to them. In the context of the present invention, the term "isosceles trapezoid shape" is limited to a "convex isosceles trapezoid shape".

The fourth zone (92d) has a bottom base in contact with and having the same width as the third zone (92c), a top base and two legs between the top and bottom bases, and the width of its top base is calculated as 2.5-5% of the total height (a) of the supporting block (92). The both acute angles described by the bottom base with each of the two legs of the fourth zone (92d) are of about 75° to about 89°. In a preferred embodiment of the present invention, both acute angles are of 81°.

The fourth zone (92d) has its bottom base in contact with and having the same width as the third zone (92c) and the width of its top base is calculated as 2.5-5% of the total height (a) of the supporting block (92).

The first zone (92a) supports the weight of the second (92b), third (92c) and fourth (92d) zones. In the region of the second zone (92b), the cooling channels may be provided. The third zone (92c) may be situated above the cooling zone (where the cooling channels may be provided) and above sealing means, preferably O-rings, used for sealing of the second zone (92b).

Figure 3:
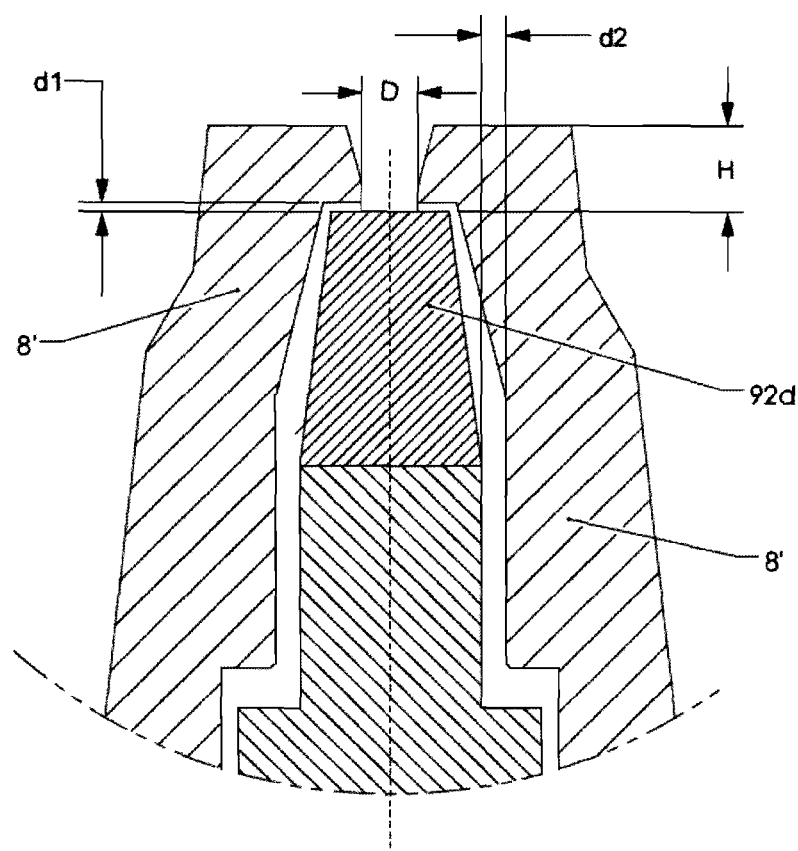
FIG. 3 depicts a detailed front view in a vertical cross section of an embodiment of the fourth zone of a supporting block of a multi-cavity mould in accordance with the present invention.
Figure 4:
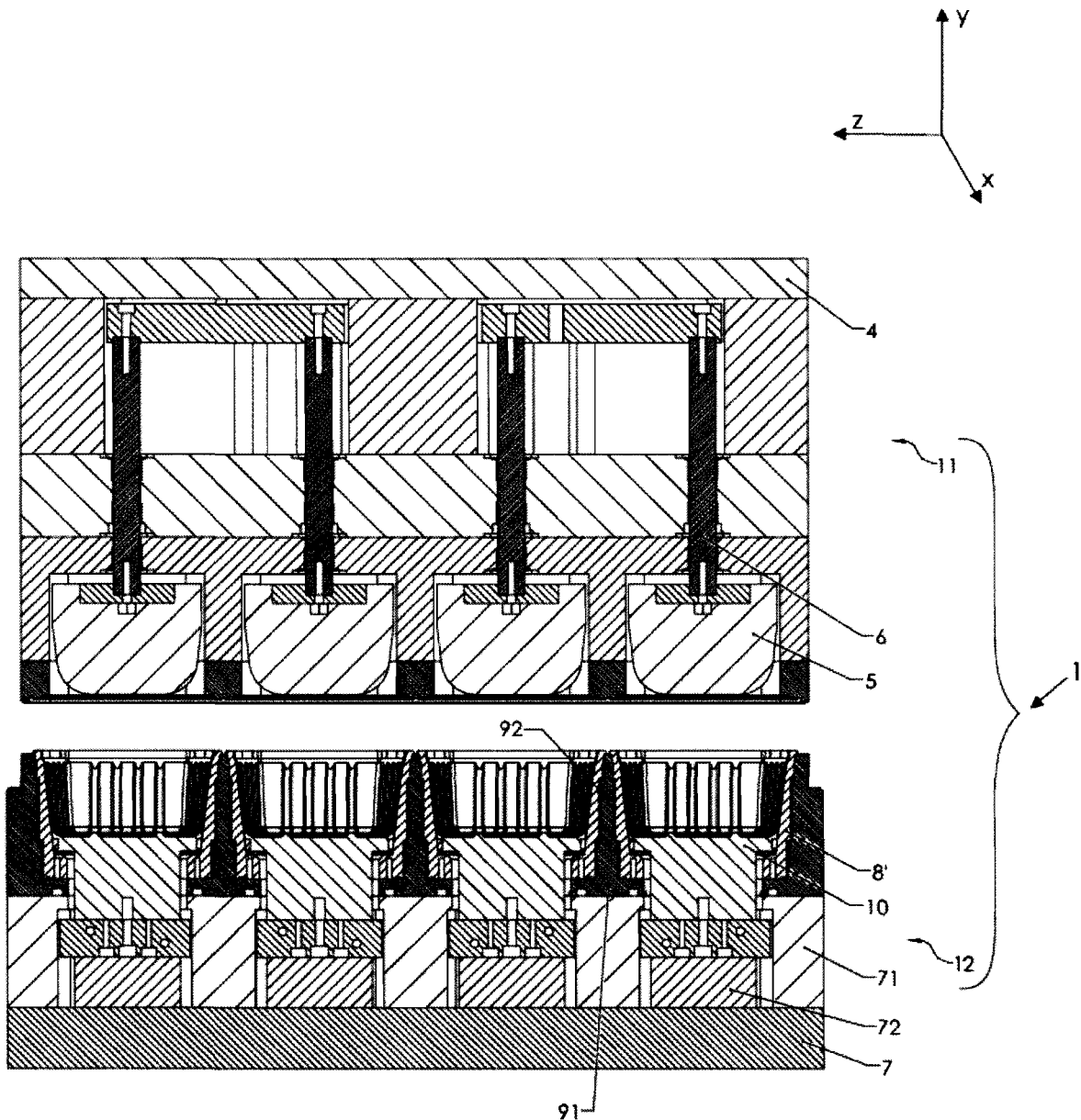
FIG. 4 depicts a detailed front view in a vertical cross section of an embodiment of a forming station of a Form/Cut/Stack mould in accordance with the present invention.
Figure 5:
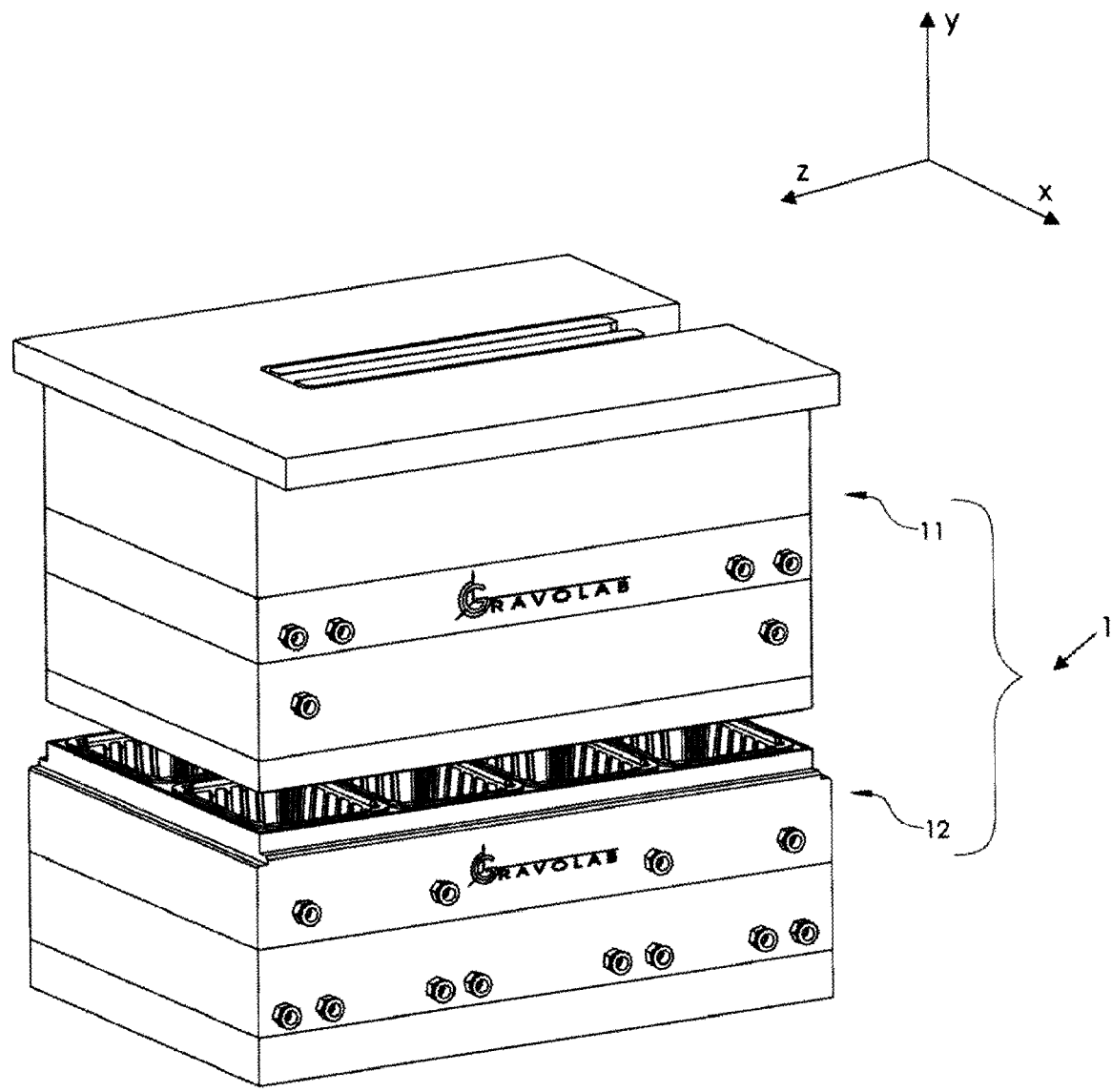
FIG. 5 depicts a perspective view of an embodiment of a forming station of a Form/Cut/Stack mould in accordance with the present invention.

The legs and top base of the fourth zone (92d) are spaced apart from a top part of adjacent cavity moulds (8') at distances (d1, d2) leaving a space between the fourth zone (92d) and the top part of adjacent cavity moulds (8') which is used for the ventilation of the formed thermoplastic products (2) inside the cavity moulds (8') (FIG. 3).

These distances (d1, d2), are predetermined distances, for example:

$$d1 = 0.02 - 0.2 \text{ mm}$$
$$d2 = 0.15 - 0.4 \text{ mm}$$

wherein:
d1 represents the distance between the top base of the fourth zone (92d) and the bottom surface of a top part of an adjacent cavity mould (8') which is extending over the top base;
d2 represents the distance between a leg of the fourth zone (92d) and the adjacent wall of a cavity mould (8').

The top rims of two adjacent cavity moulds (8') extend over a part of the top base of the fourth zone (92d) of the supporting block (92) situated between them, leaving a middle portion of the top base uncovered, with a width (D) of about 1.5 mm to about 6 mm (FIG. 3). Preferably, the width (D) of the middle portion is of about 2 to 4 mm and more preferably about 3.2 mm. The width (D) of the middle portion of about 3.2 mm is preferred because it is the ideal dimension for the standard range of thermoplastic sheet (3) thicknesses as long as the distance (H) measured between the top of the top base of the fourth zone (92d) and the top rim of an adjacent cavity mould (8') is not altered above the standard dimensions for a product's rim (usually about 3 to 5 mm). Also, the distance (D) between two adjacent cavity moulds (8') in the fourth zone (92d), where the products (2) are formed, cannot be less than:

$$2 \times (A + b) \text{ [mm]},$$

wherein
A=thickness of a thermoplastic sheet (3) [mm] (FIGS. 14-16);
b=a minimum coefficient which is chosen according to the thickness (A) of a thermoplastic sheet (3) [mm];
b is preferably 0.3 to 1.3 mm for the standard thickness (0.3 to 1.2 mm) of a thin-gauge thermoplastic sheet (3).

Figure 14:
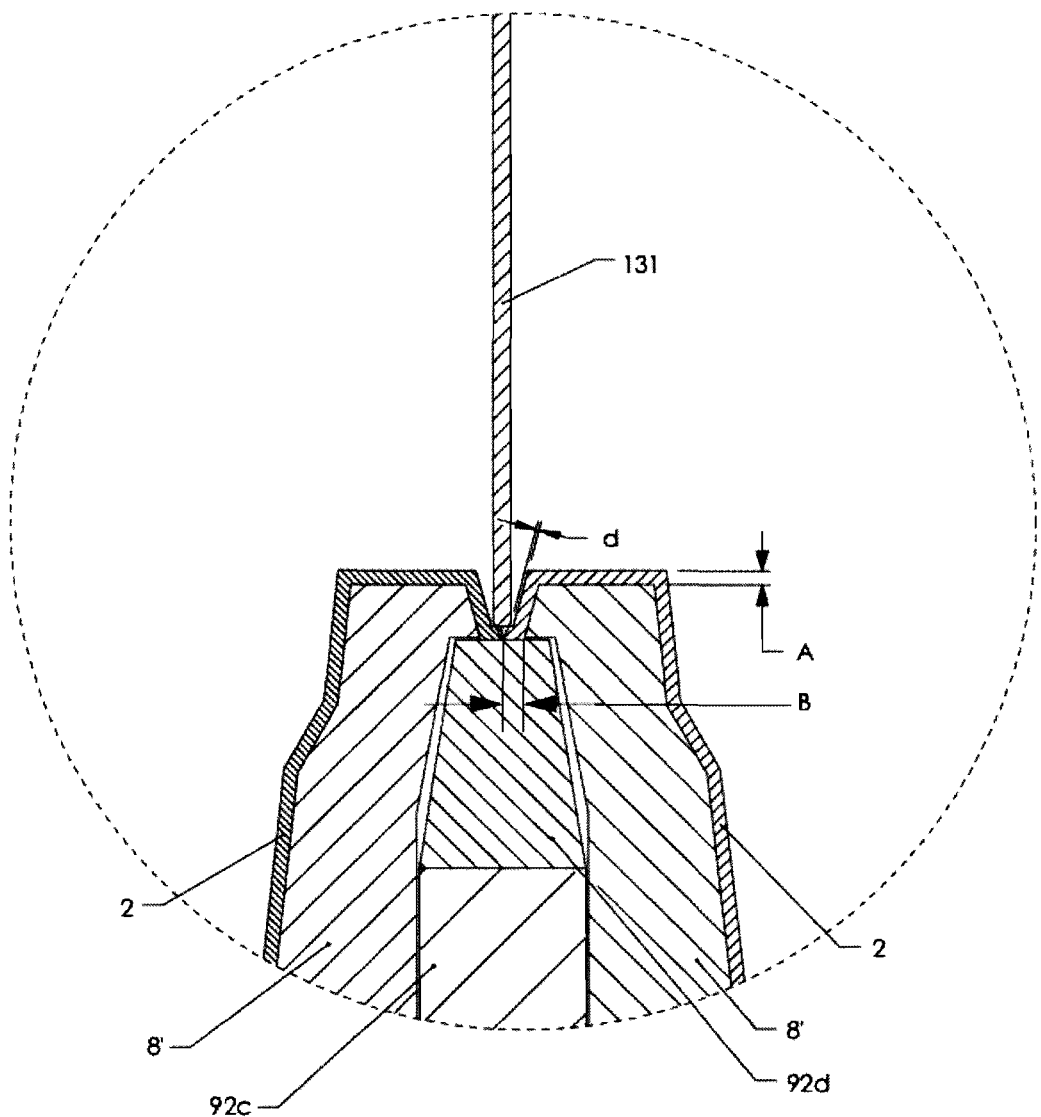
FIG. 14 depicts a detailed front view in a vertical cross section of an embodiment of the fourth zone of a supporting block of a multi-cavity mould in accordance with the present invention and a steel-rule die cutting on the common-edge between two adjacent formed products.
Figure 15:
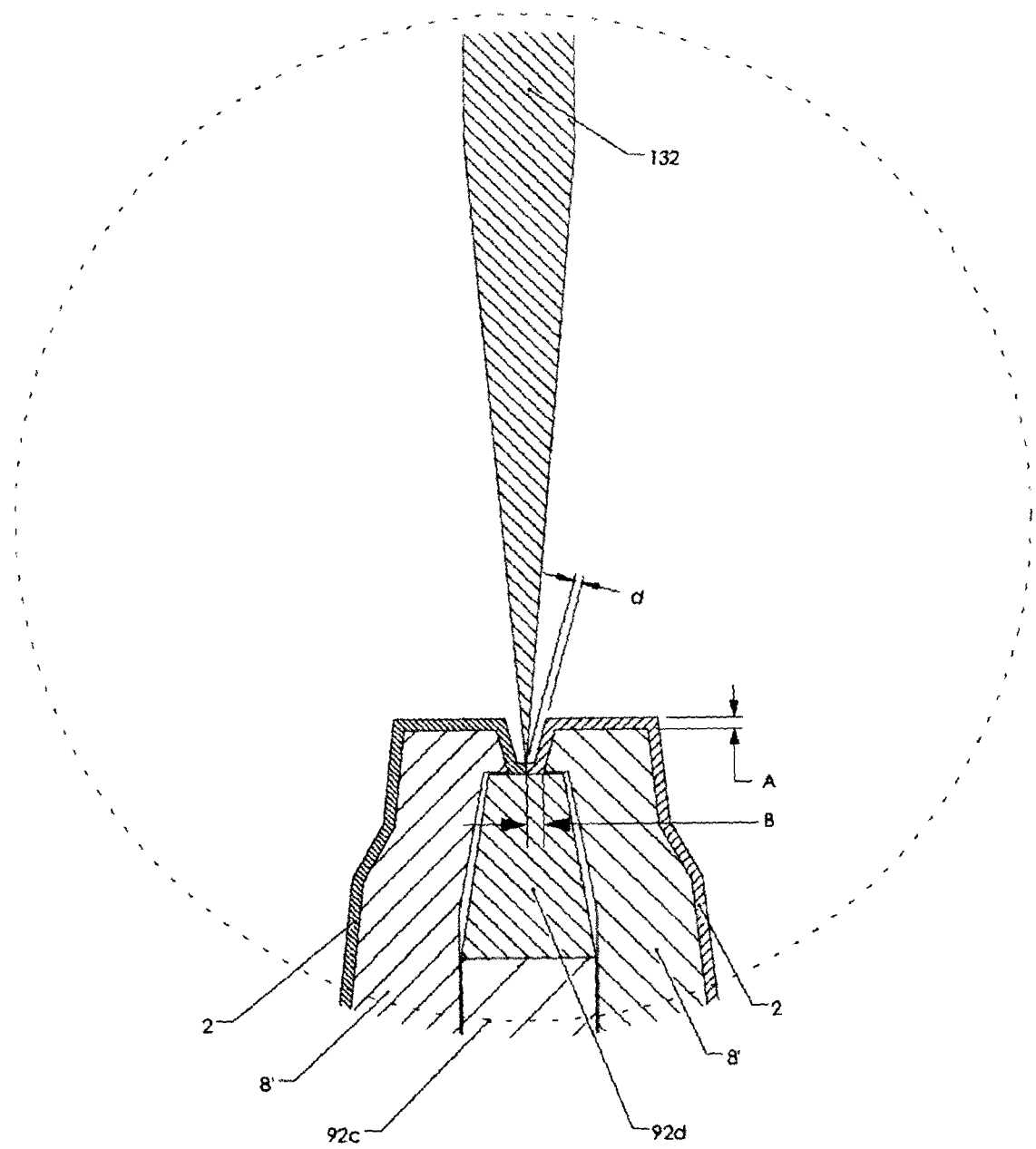
FIG. 15 depicts a detailed front view in a vertical cross section of an embodiment of the fourth zone of a supporting block of a multi-cavity mould in accordance with the present invention and a CNC die or forged die cutting on the common-edge between two adjacent formed products.
Figure 16:
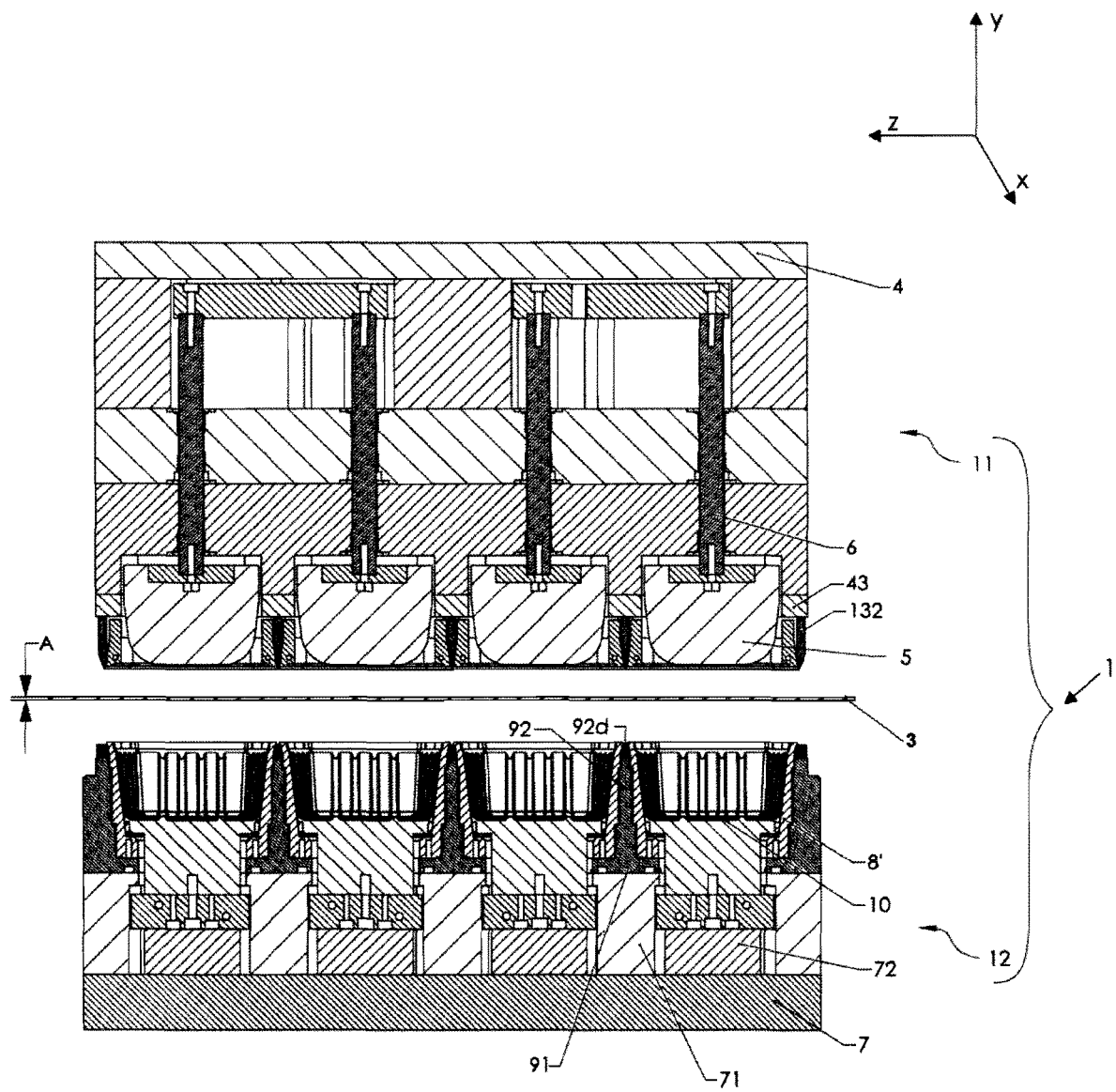
FIG. 16 depicts a detailed front view in a vertical cross section of an embodiment of a In-Mould-Cut mould in an open position (non-operating position), comprising CNC dies or forged dies in accordance with the present invention.
Figure 17:
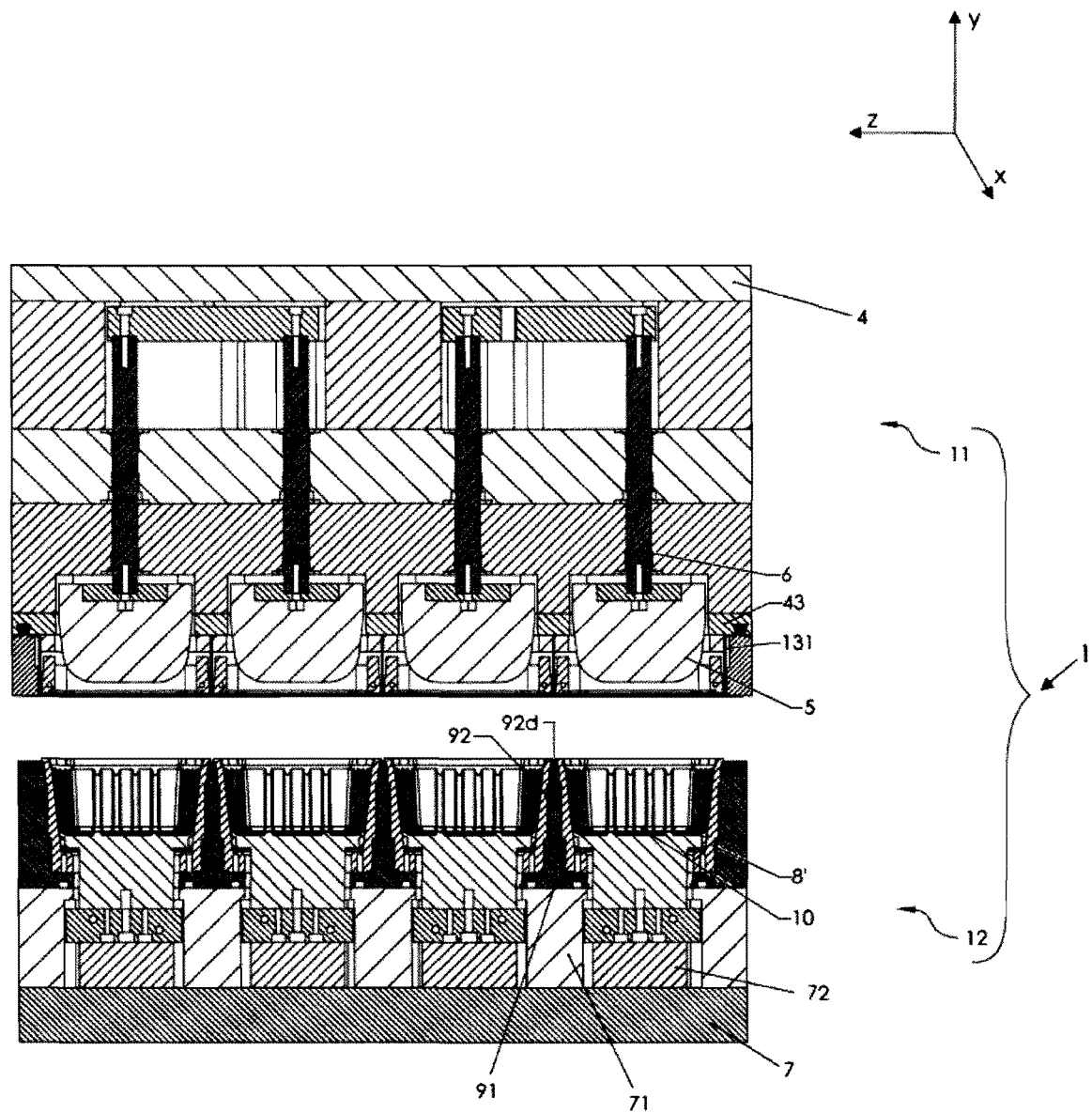
FIG. 17 depicts a detailed front view in a vertical cross section of an embodiment of a In-Mould-Cut mould comprising steel-rule dies in accordance with the present invention.
Figure 18:
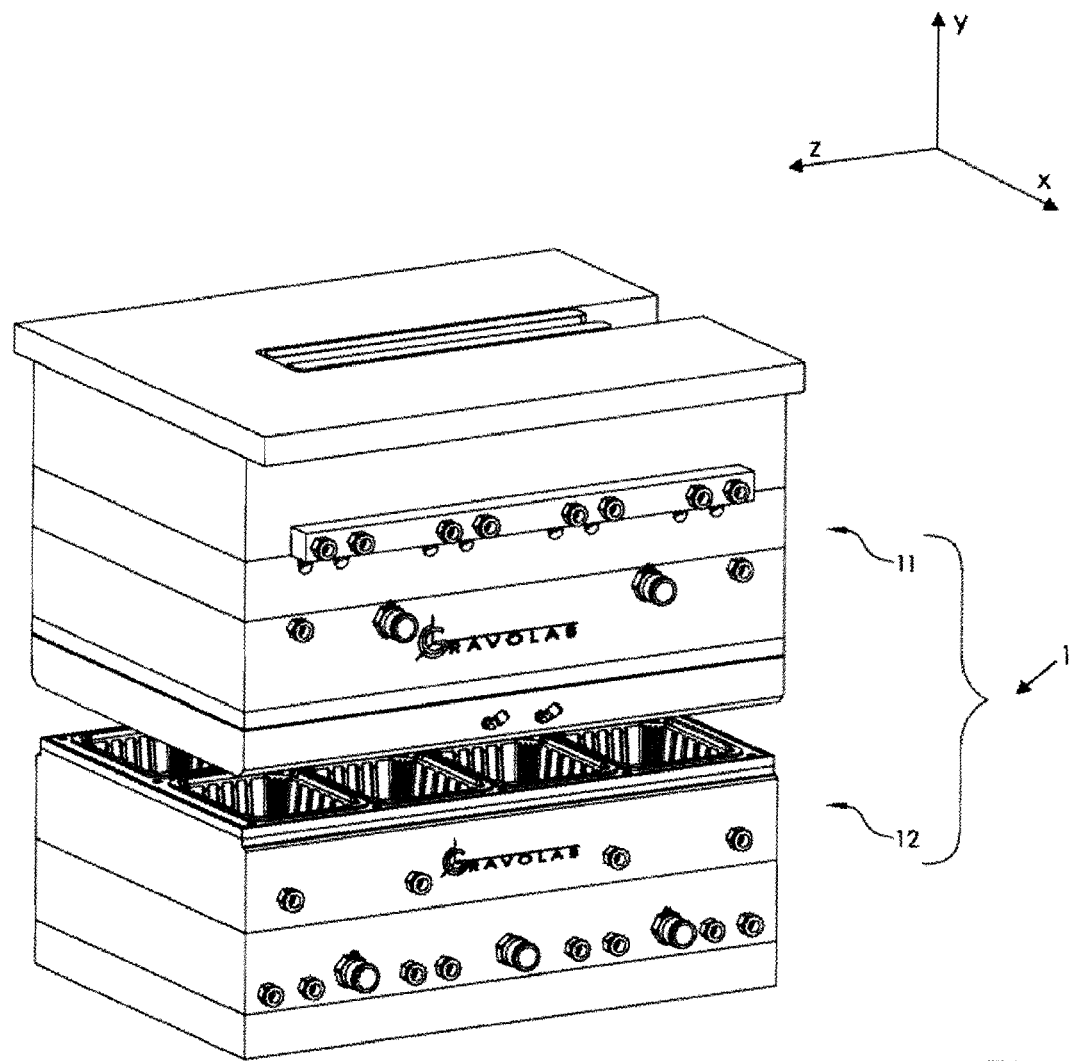
FIG. 18 depicts a perspective view of an embodiment of a In-Mould-Cut mould comprising steel-rule dies in accordance with the present invention.

A secondary flange (B) of a formed product (2) is a projecting edge of a formed thermoplastic product (2) used for connecting two adjacent formed products (2) in the forming and/or cutting stations of a thermoforming machine (FIGS. 14-15).

B=½ of the width (D) of the middle portion [mm] and the width of the secondary flange (B) usually cannot be less than (A+b).

This limitation is due to the further alignment of the cutting dies with respect to the formed products (2) inside the cavities (8) in a cutting station of a Form/Cut/Stack mould or in a In-Mould-Cut mould and to the alignment precision of, for example, an auto-centering assembly with a non-zero tolerance.

Two adjacent secondary flanges (B) of formed plastic products (2) are joined together by a common-edge which falls within the middle portion of the top base of the fourth zone (92d). When the formed plastic products (2) are placed in the cavities (8), for example of a cutting station, the upper tool (11) which comprises a plurality of common-edge cut dies (131, 132) is arranged to sever the adjacent formed plastic products (2) on the common edge, in order to obtain finished thin-gauge plastic products (2). In the Form/Cut/Stack or In-Mould-Cut thermoforming moulds according to the present invention, the common edges are arranged in the transport direction (x) and/or in a direction (z) perpendicular to the transport direction (x) in the same horizontal plane. The common-edge cut dies (131, 132) are cutting dies with a common-edge/jointed pattern. The design of the common-edge cut dies (131, 132) allows for cut adjacent formed plastic products (2) to be separated from the plastic material (2) more easily and provide for zero trim material between the two patterns. The common-edge cut dies (131, 132) are preferably steel-rule dies (131), CNC dies (132) or forged dies (132).

In the Form/Cut/Stack or In-Mould-Cut thermoforming moulds according to the present invention, it is desirable to have a minimum clearance space (d), preferably of 0.3 to 1.1 mm, between the common-edge cut dies (131, 132) and the preheated thermoplastic sheet (3) placed on adjacent cavity moulds (8')/adjacent cavities (8) (FIGS. 14-15) in order to avoid that:
the co-extruded material will adhere to the common-edge cut dies (131, 132), causing cutting problems;

the cavity moulds (8') will be pressed inside and lateral forces will be applied on the dies (131, 132); forces that can break the common-edge cut dies (131, 132).

Also, the material (3) pressed between the common-edge cut dies (131, 132) and the cavity moulds (8') has no natural elongation but suffers from a plastic deformation. Its surface may be affected in this area, and in the case of materials (3) with a protective foil (glued or co-extruded, like PP/PE or PET/PE), this can become a problem, meaning that co-extruded material/foil can adhere to the common-edge cut dies (131, 132) (successive deposits). The preferred minimum clearance space (d) is of about 1 mm, thus allowing tighter centering tolerances for a precise cutting, considerably eliminating the centering errors.

The stepped profile of the supporting block (92), according to the present invention, ensures an increased rigidity of the supporting block (92) and the adjacent cavity moulds (8') while allowing a proximal arrangement of the adjacent cavity moulds (8') relative to a central symmetry axis of the supporting block (92) in a vertical cross section through a plane perpendicular to the base plate (91). The increased rigidity also supports the cooling agent's (usually water) pressure acting between the supporting block (92) and the exterior walls of the adjacent cavity moulds (8').

Referring to FIGS. 4-5, 16, 17, 20, a multi-cavity mould (1) has an upper tool (11) and a lower tool (12) being operable to simultaneously form a plurality of thin-gauge plastic products (2) in corresponding cavity moulds (8') arranged inside the cavities (8) of the lower tool (12) in an x-z array. The upper tool (11) comprises a top base plate (4) and a plurality of plug moulds (5) arranged in an x-z array. The plug moulds (5) are connected to the top base plate (4) in a translational manner by means of driving rods (6) in such a way that the plug moulds (5) can move in a direction (y) perpendicular to a transport direction (x) of the preheated thin-gauge thermoplastic sheet (3) placed between the upper tool (11) and the lower tool (12).

The lower tool (12) also comprises a bottom base plate (7) connected to the plurality of base plates (91) via spacer blocks (71); a plurality of mobile plates (72) connected in a translational manner to the bottom base plate (7) and capable of moving in the direction (y) perpendicular to the transport direction (x) of the preheated thin-gauge thermoplastic sheet (3).

Figure 7:
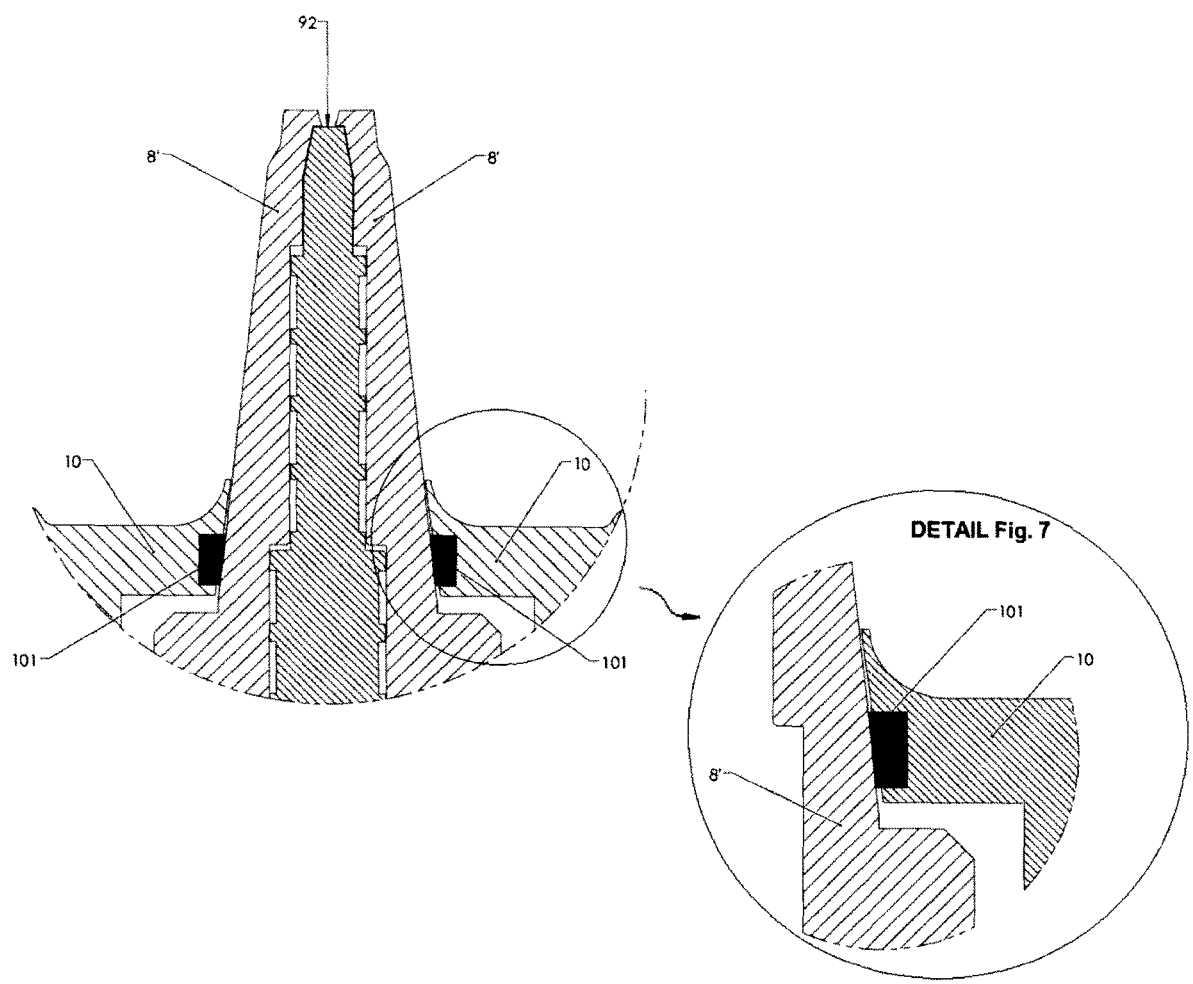
FIG. 7 depicts a detailed front view in a vertical cross section of an embodiment of a supporting block of a multi-cavity mould comprising additional support means, in accordance with the present invention.
Figure 8:
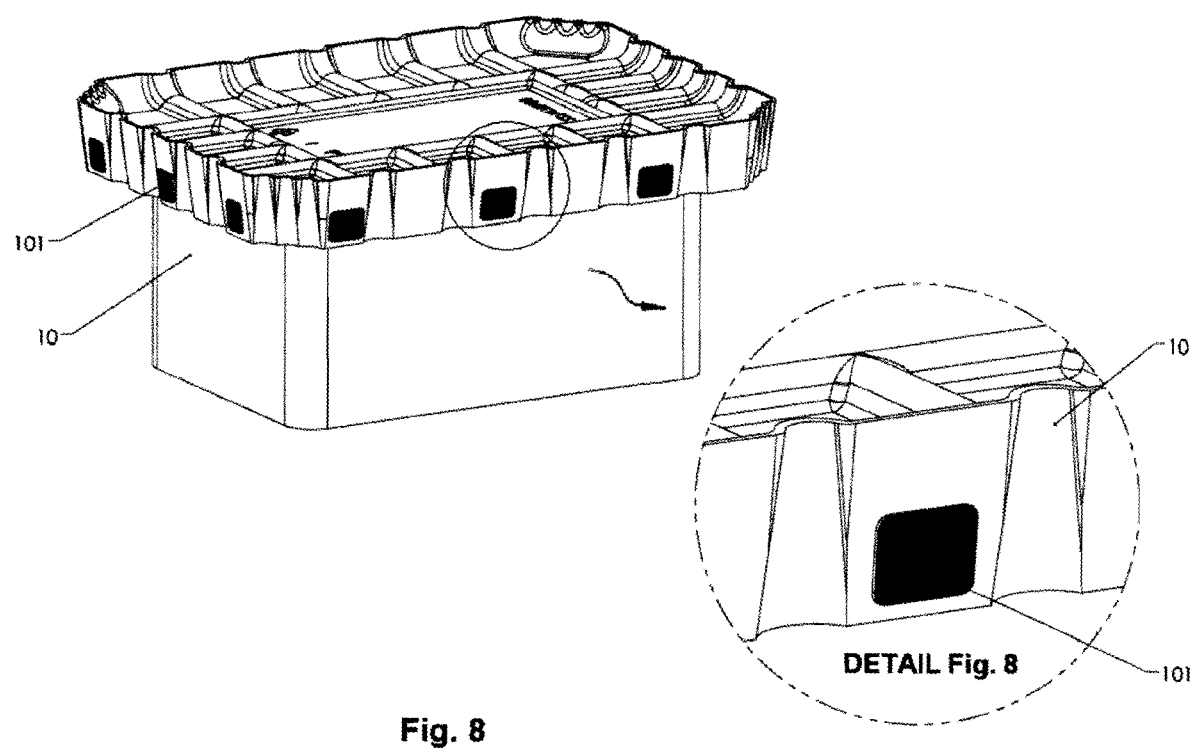
FIG. 8 depicts a perspective view of an embodiment of a mould insert of a multi-cavity mould comprising additional support means, in accordance with the present invention.

The lower tool (12) further comprises a plurality of mould inserts (10) for matching a corresponding cavity mould's (8') model (FIGS. 7-8). Mould inserts (10) are parts of the cavity mould (8') that are created separately from the cavity mould (8') block. Mould inserts (10) are inserted in the cavity mould (8') block to achieve a desired cavity shape or cooling effect. An insert (10) may assist heat transfer only if a cooling channel is located in or near the mould insert (10). Inserts (10) can also be used to modify the rate of cooling in specific areas of the cavity mould (8'). An example is a product (2) with ribs that are thinner than its main surface. There is a natural tendency for the product (2) to deflect away from the thinner ribs as the main surface has higher area shrinkage. By running the rib area hotter (i.e. conductivity mould insert), the product (2) can be deflected back to the required shape. In some cases, an insert (10) of lower conductivity or containing a separate cooling circuit, can be used to form the ribs. This gives better control of the rib temperature. Optionally, a mould insert (10) may have narrow water channels (also known as "water lines") passing through it, as in a baffle.

Multiple products (2) that have only minor variations between them may be produced using interchangeable mould inserts (10). All common features are produced by the cavity mould (8'), but the unique feature is produced with an insert (10) that can be pulled out and replaced with another insert (10) containing an alternative feature. Also, sharing a common cavity mould (8') and utilizing mould inserts (10) minimizes the tooling fabrication needed, providing tooling cost savings.

In special situations, for example, where the geometry of the finished product (2) will not allow sufficient rigidity and the thickness of the cavity mould's (8') wall cannot be reconfigured, additional support means (101) placed on the exterior top surfaces of the mould inserts (10), and contacting the cavity mould's (8') inner walls may be used (FIG. 8). The additional support means (101) may be Polytetrafluoroethylene (PTFE) pads, more preferably 10 mm×10 mm PTFE square pads. These PTFE pads reduce friction (has one of the lowest coefficients of friction of any solid), wear, and corrosion of the thermoforming mould (it is a non-reactive compound). It maintains high strength, toughness and self-lubrication at low temperatures down to −268.15° C. and good flexibility at temperatures above −79° C. PTFE is also hydrophobic and possesses fairly high heat resistance.

The stepped profile and increased rigidity of the supporting block (92), according to the present invention, enable a standardized execution of the water channels for cooling around the cavity moulds (8'), thus eliminating any water flow rate restriction in the water channels. These cooling water channels may be vertical channels with a medium cross section of about 10 to 20 mm$^2$, placed on the first (92a) and second zones (92b) of the supporting block (92).

Figure 2:
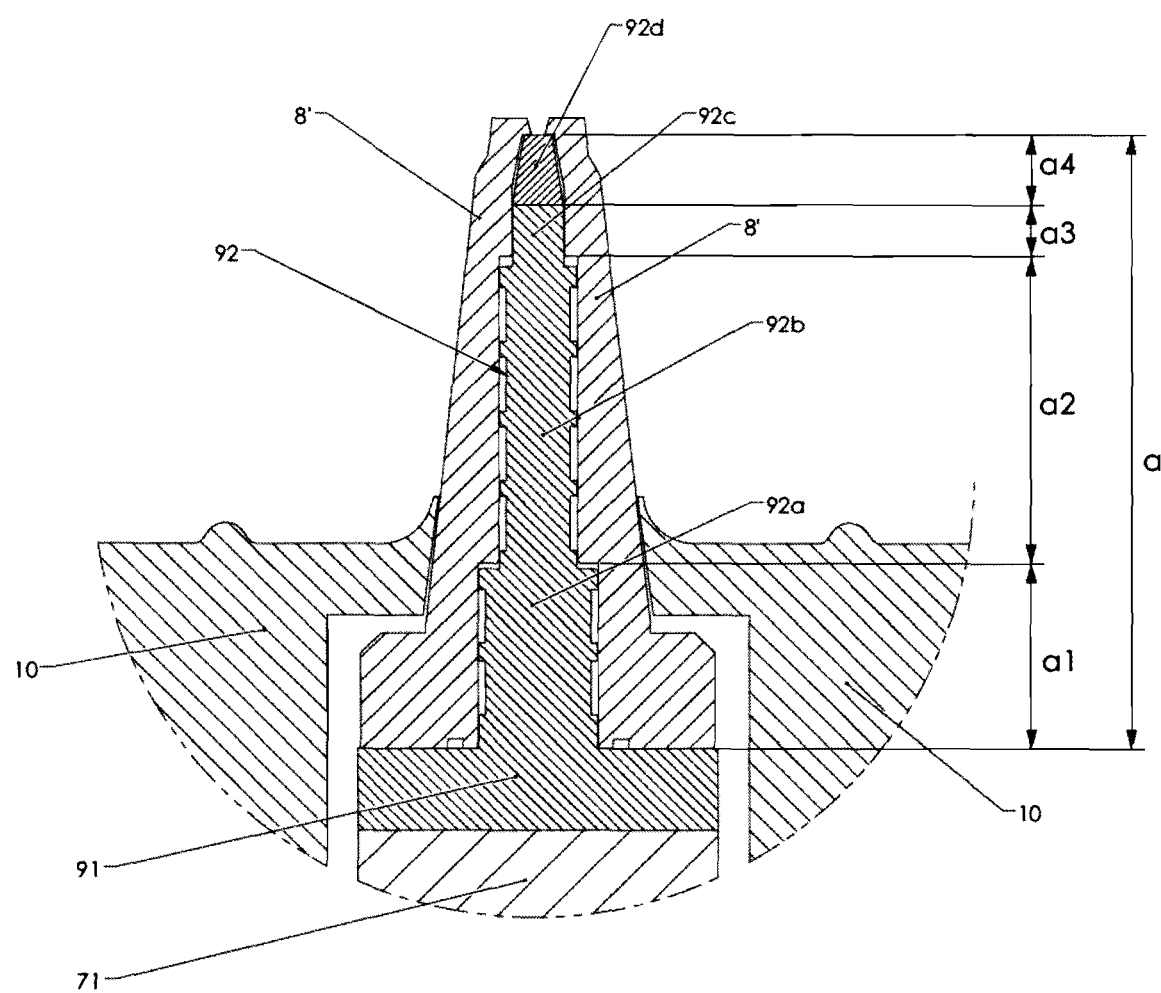
FIG. 2 depicts a detailed front view in a vertical cross section of an embodiment of a supporting block of a multi-cavity mould in accordance with the present invention.
Figure 6:
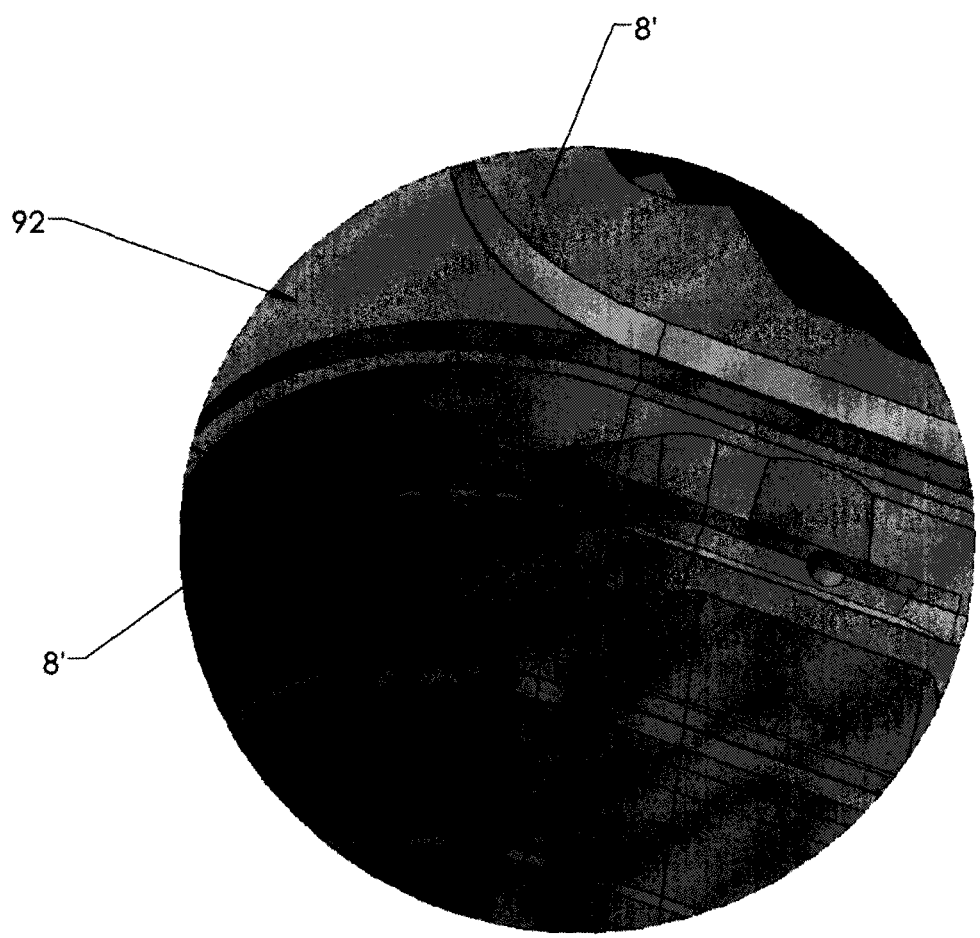
FIG. 6 depicts a detailed perspective view of adjacent cavity moulds having a common-edge in accordance with the present invention.
Figure 9:
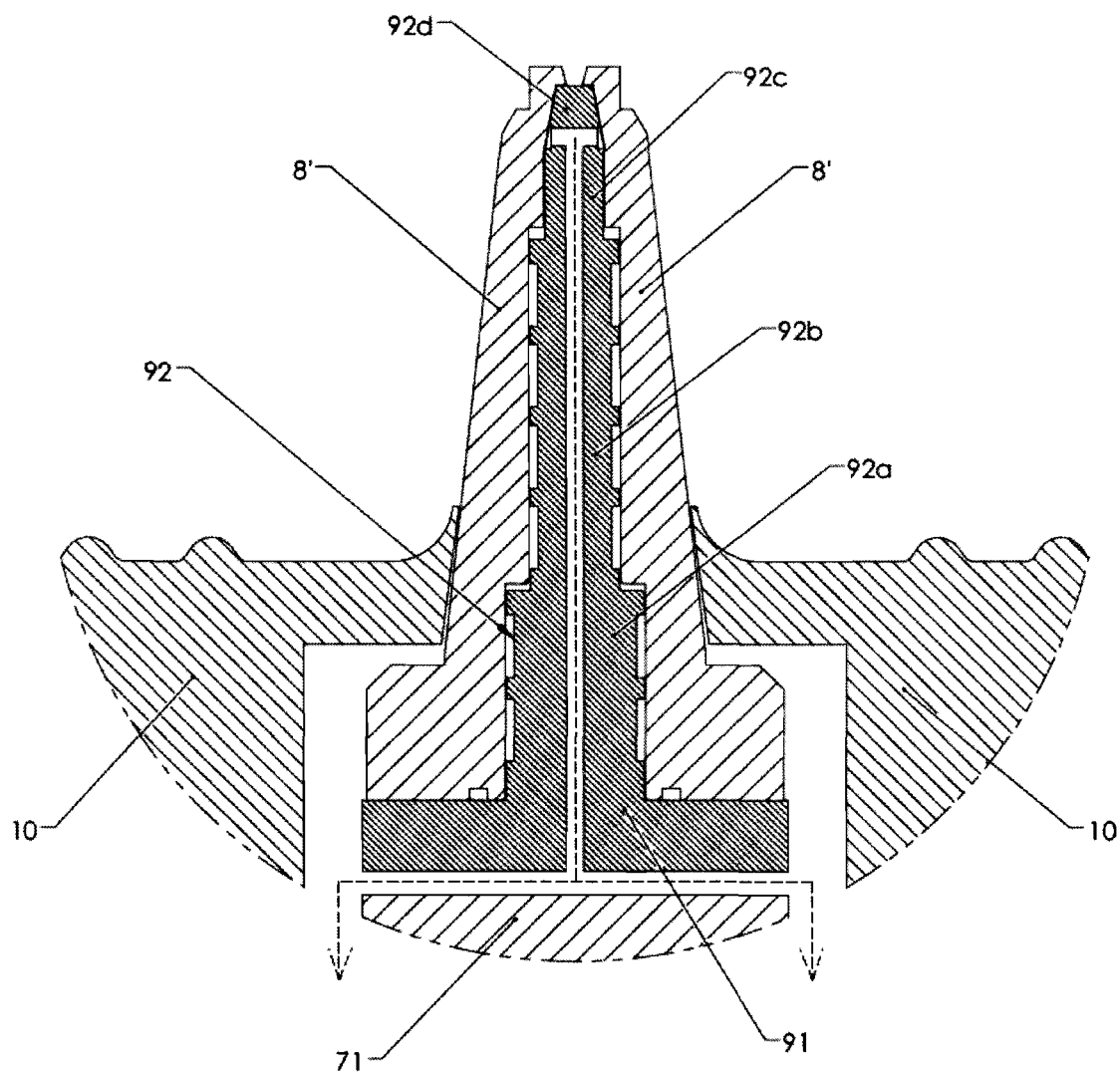
FIG. 9 depicts a detailed front view in a vertical cross section of an embodiment of a supporting block of a multi-cavity mould comprising ventilation channels, in accordance with the present invention.

Product ventilation does not suffer due to the stepped re-configuration of the supporting block (92) and of the adjacent cavities (8)/adjacent cavity moulds (8'). The air trapped in the upper areas of the finished products (2) is evacuated for example through ventilation holes and/or channels in the supporting block (92) (FIGS. 2, 6, 9).

Referring to FIGS. 10, 11, 16, 17, 20, a multi-cavity mould (1) has an upper tool (11) and a lower tool (12) being operable to simultaneously sever a plurality of thin-gauge plastic products (2) from a thin-gauge thermoplastic sheet (3) by moving the upper tool (11) and lower tool (12) towards each other in a direction (y) perpendicular to a transport direction (x) of the thin-gauge thermoplastic sheet (3) when formed plastic products (2), connected to each other by the common edge, are placed in the cavities (8). The upper tool (11) comprises a plurality of common-edge cut dies (131, 132) which are arranged to sever, the adjacent formed plastic products (2) on the common edge.

Figure 10:
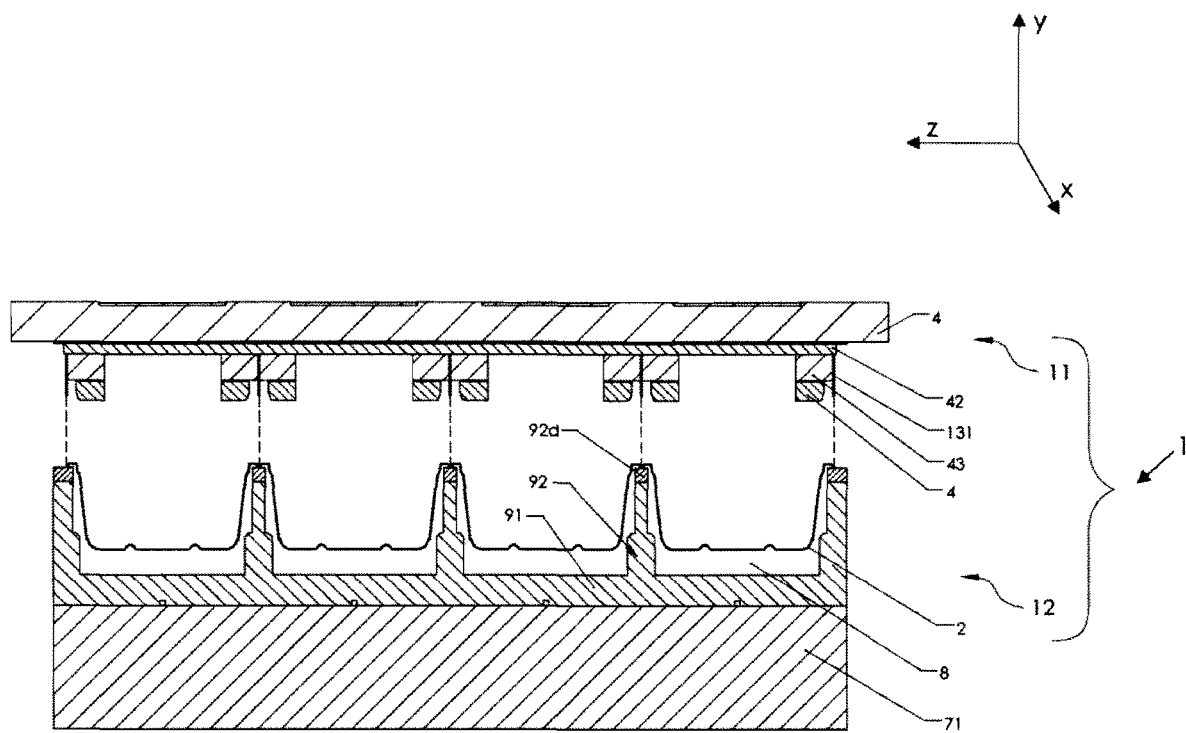
FIG. 10 depicts a detailed front view in a vertical cross section of an embodiment of a cutting station of a Form/Cut/Stack mould in accordance with the present invention.
Figure 11:
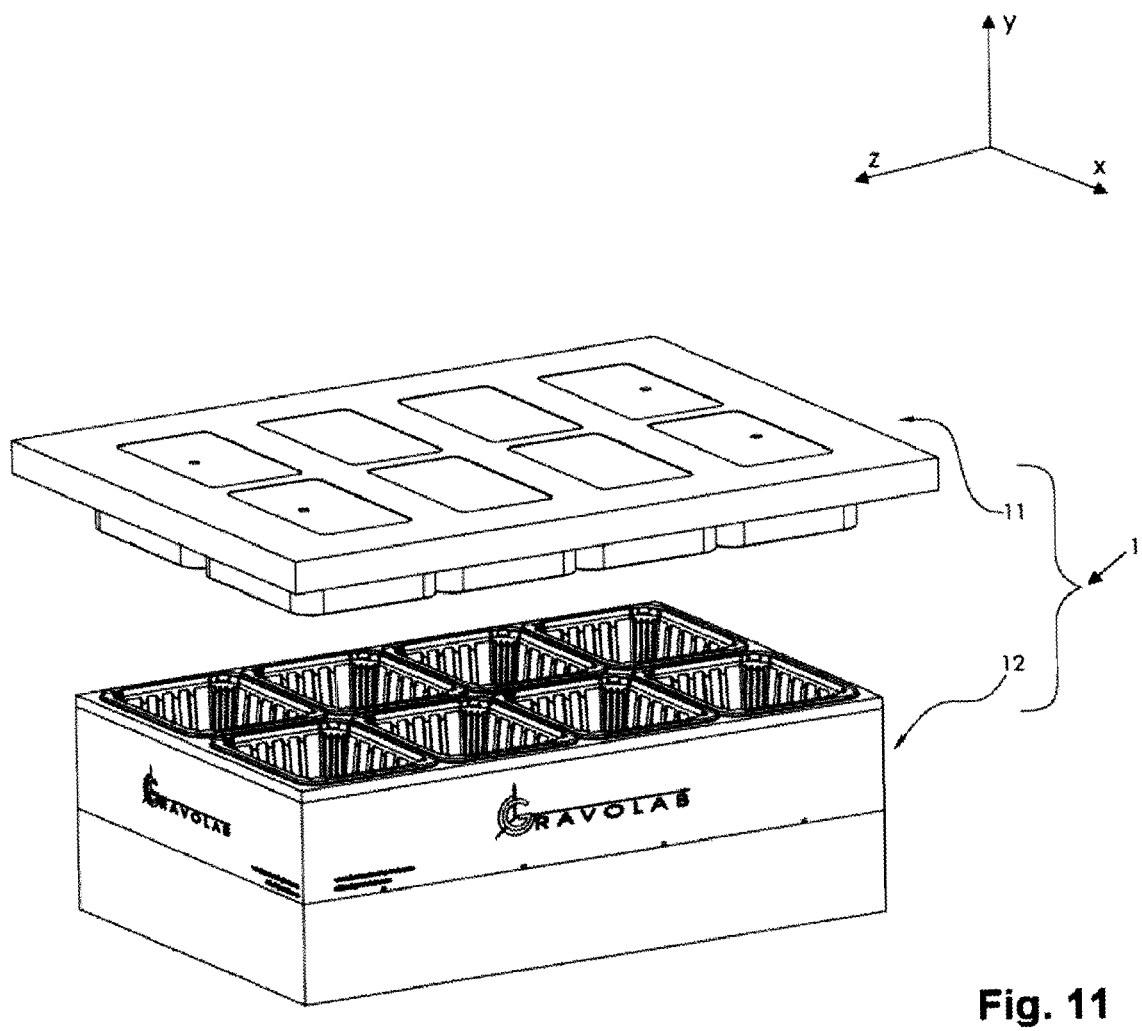
FIG. 11 depicts a perspective view of an embodiment of a cutting station of a Form/Cut/Stack mould in accordance with the present invention.

In the lower tool (12), the plurality of base plates (91) may be connected to each other to form a continuous base plate (91) (FIG. 10).

Figure 12:
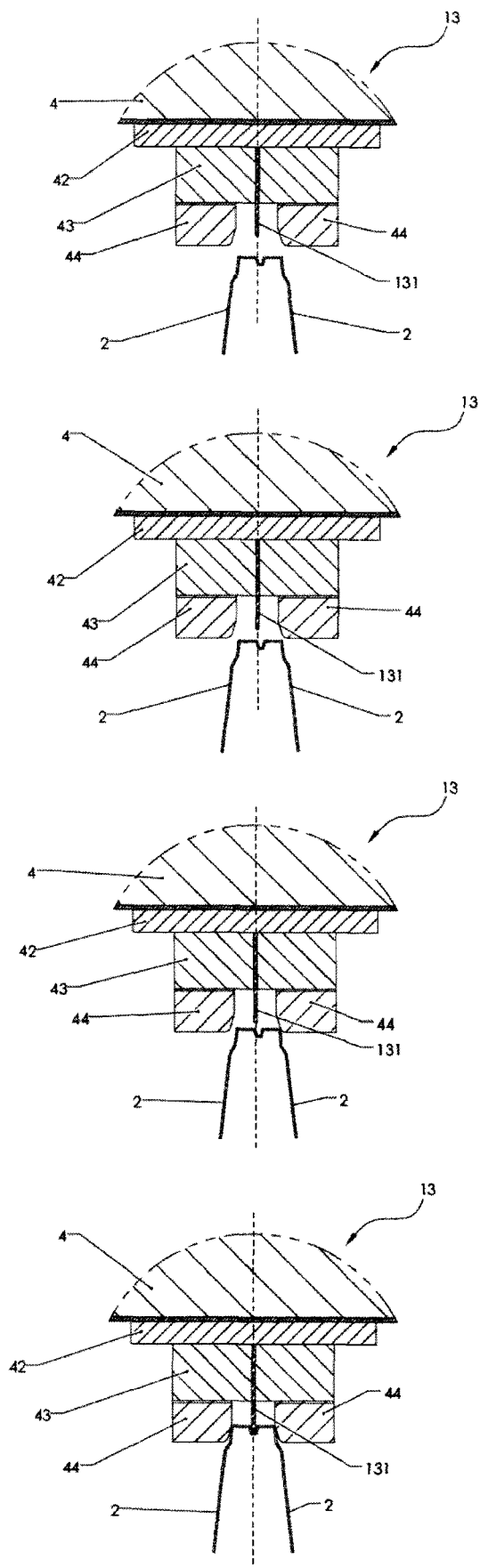
FIG. 12 depicts a detailed front view in a vertical cross section of the process of auto-centering using auto centering plugs in floating dies assemblies in accordance with the present invention.
Figure 19A:
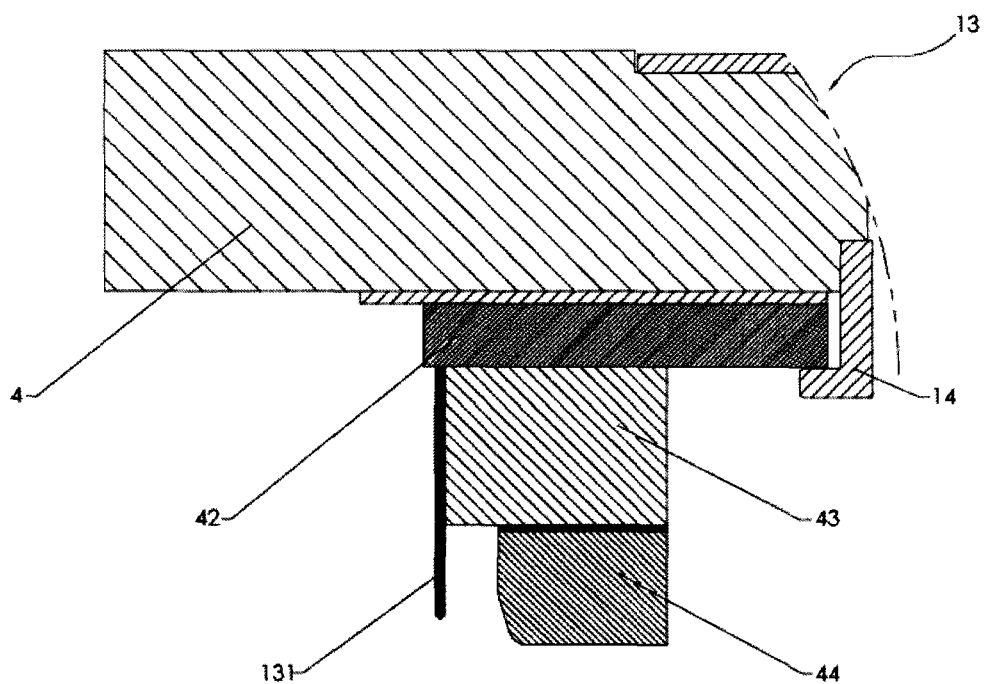
FIG. 19a depicts a detailed front view in a vertical cross section of an embodiment of a floating die assembly with steel-rule dies in accordance with the present invention.
Figure 22:
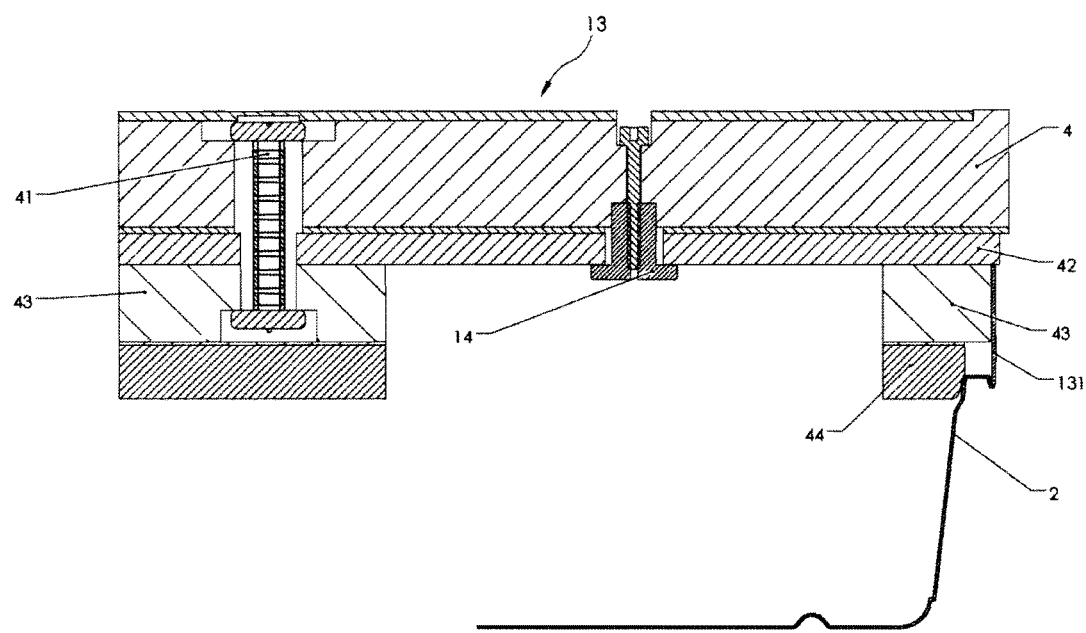
FIG. 22 depicts a detailed front view in a vertical cross section of an embodiment of a floating die assembly comprising a bushing guide and an extension spring in accordance with the present invention.

In a Form/Cut/Stack thermoforming mould, according to the present invention, the plurality of common-edge cut dies (131, 132) are grouped into a plurality of floating die assemblies (13) arranged in an x-z array on a supporting base (42) and connected to a top base plate (4) of the upper tool (11) by means of a plurality of guiding means (14) (FIGS. 12, 19a, 22). The guiding means (14) are preferably bushing guides (14) with a relative movement, in the horizontal (x-z) plane of the plurality of floating die assemblies (13), of about 1 to 3 mm, more preferably of about 2.5 mm. The horizontal movement is limited by the bushing guide's (14) diameter and by its mounting bore's diameter. The relative movement is used for a precise positioning of the common-edge cut dies (131, 132) relative to the common-edge of the adjacent formed plastic products (2) by auto-centering the plurality of floating die assemblies (13). The bushing guides (14) are made from example from metal, preferably bronze.

Optionally, between the supporting base (42) and the top base plate (4) of the upper tool (11), an intermediate plate (not-shown), made preferably from stainless steel, may be provided for enhanced support of the floating die assemblies (13).

The term "floating die" in the context of the present invention is to be understood as a common-edge cut die (131, 132), mounted in a die holder (43) such as a slight amount of motion compensates for tolerance in the common-edge cut die (131, 132) parts or the work. The term "floating die" in the context of the present invention may also refer to a common-edge cut die (131, 132) mounted on heavy springs to allow vertical motion and easy centering of the common-edge cut die (131, 132) in some trimming, shearing, and forming operations.

Each floating die assembly (13) comprises a die holder (43) connected to the supporting base (42). Each common-edge cut die (131, 132) is connected to both the supporting base (42) and the die holder (43). The floating die assembly (13) also comprises an assembly of auto centering plugs (44) arranged on the die holder (43).

Conventional auto-centering, most commonly found in the Form/Cut/Stack thermoforming moulds, is based on additional centering features on the thermoplastic sheet (3), not necessarily with respect to the thermoformed products (2). In the present invention, the auto-centering is done by means of auto centering plugs (44), which are configured to come into contact with the thermoformed products (2) on their most rigid top areas before closing the cutting station and to pull all the floating die assemblies (13) as close as possible to the thermoformed products (2), thus aligning the common-edge cut die (131, 132) on the common edge between adjacent formed plastic products (2). The auto centering plugs (44) are preferably rigid, CNC-machined parts (i.e. Computer Numerical Control (CNC)), positioned very precisely (0.1 mm precision), with respect to the cutting contour of the products (2).

The edges of the common-edge cut dies (131, 132) contact different top areas of the thermoformed products (2) (during closing of the cutting station) while pushing or pulling the plurality of floating die assemblies (13) or even re-aligning to some extent the products (2) with the cutting contour (the products (2) are off-centered). This is due to the fact that the thermoformed sheet of material (3), after leaving the forming station, is subject to deformation between the forming station and the cutting station due to the precision of the conveyor chains, the parallelism or the non-parallelism between the conveyor chains, due to the shrinkage of the thermoplastic sheet (3) or due to the stretching of the thermoplastic sheet (3) between the chains, or other known reasons.

Figure 13:
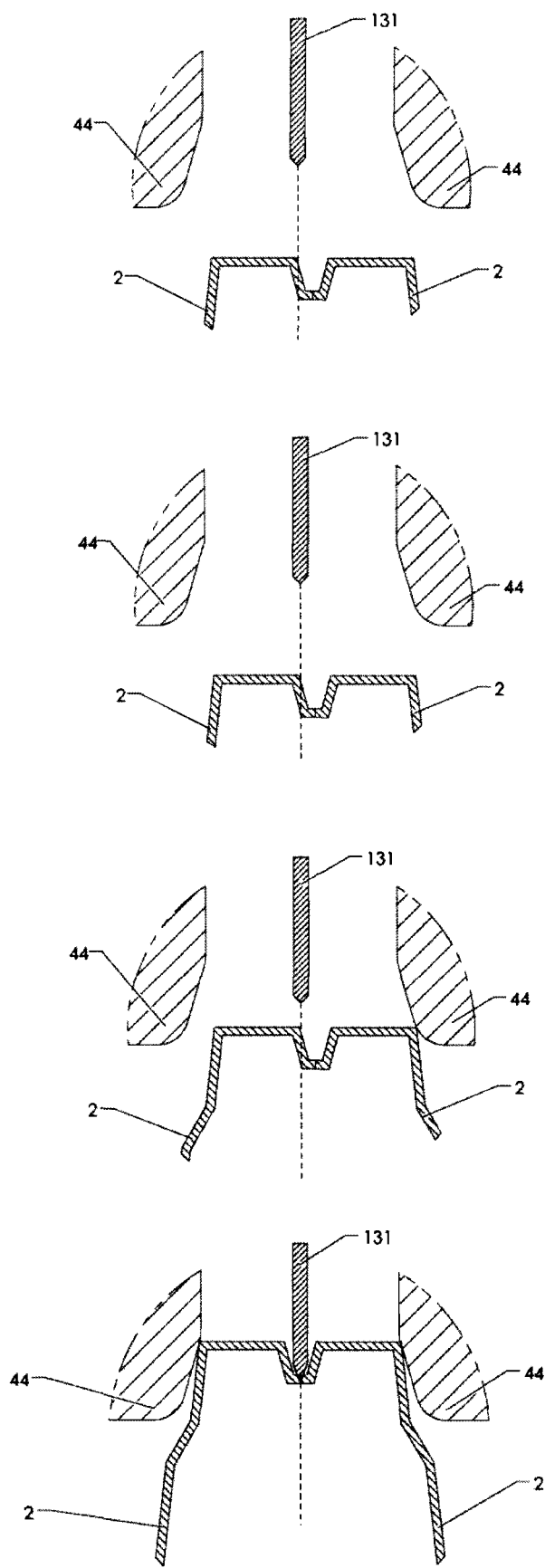
FIG. 13 depicts a detailed front view in a vertical cross section of the process of auto-centering using auto centering plugs in accordance with the present invention.

The process of auto-centering using auto centering plugs (44) according to the present invention is depicted in FIGS. 12 and 13.

Due to the fact that in most cases the floating die assemblies (13) are mounted in the upper tool (11) having the common-edge cut dies (131, 132) edges facing downwards toward the thin-gauge thermoplastic sheet (3), the large weight of the floating die assembly (13) is upheld by using for example, a plurality of resilient means (41) between the top base plate (4) and the die holder (43), a solution valid for the floating die assemblies (13) with steel-rule dies (131) or CNC dies (132), forged dies (132). Preferably, the plurality of resilient means (41) is a plurality of extension springs (41) made of stainless steel and according with DIN 2097, range A, more preferably zinc-plated (FIG. 22). This type of extension springs (41) is preferred because of its low cost of manufacturing, high corrosion resistance and high operating temperatures (about 200° C.). The extension of a resilient means (41) or in this preferred example, an extension spring (41) (its distended length minus its relaxed length) is linearly proportional to its tension, the force used to stretch it. Similarly, the contraction (negative extension) is proportional to the compression (negative tension).

Figure 19B:
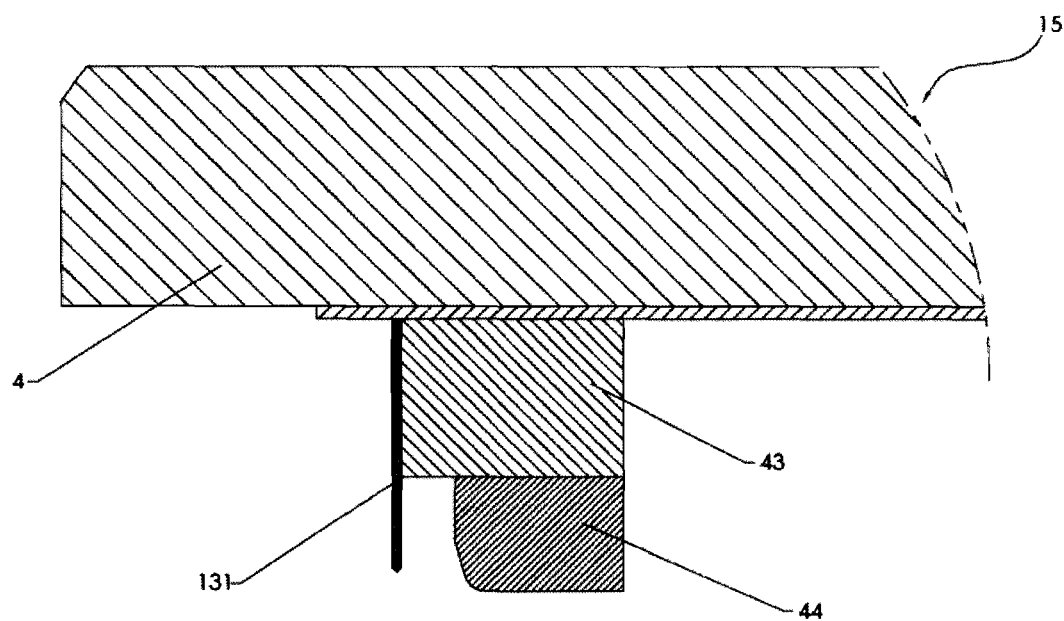
FIG. 19b depicts a detailed front view in a vertical cross section of an embodiment of a fixed die assembly with steel-rule dies in accordance with the present invention.
Figure 20:
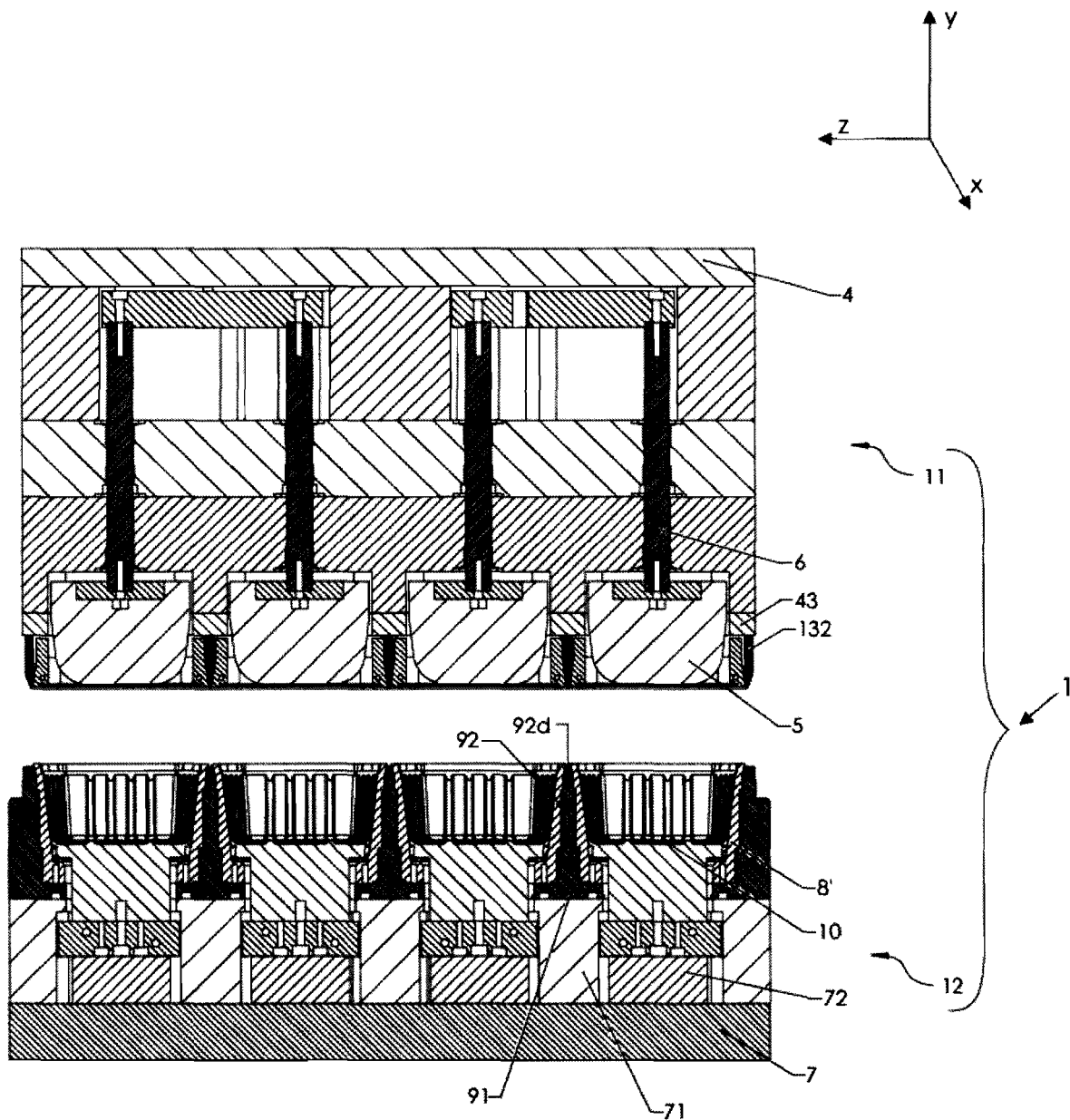
FIG. 20 depicts a detailed front view in a vertical cross section of an embodiment of a In-Mould-Cut mould comprising CNC dies or forged dies in accordance with the present invention.
Figure 21:
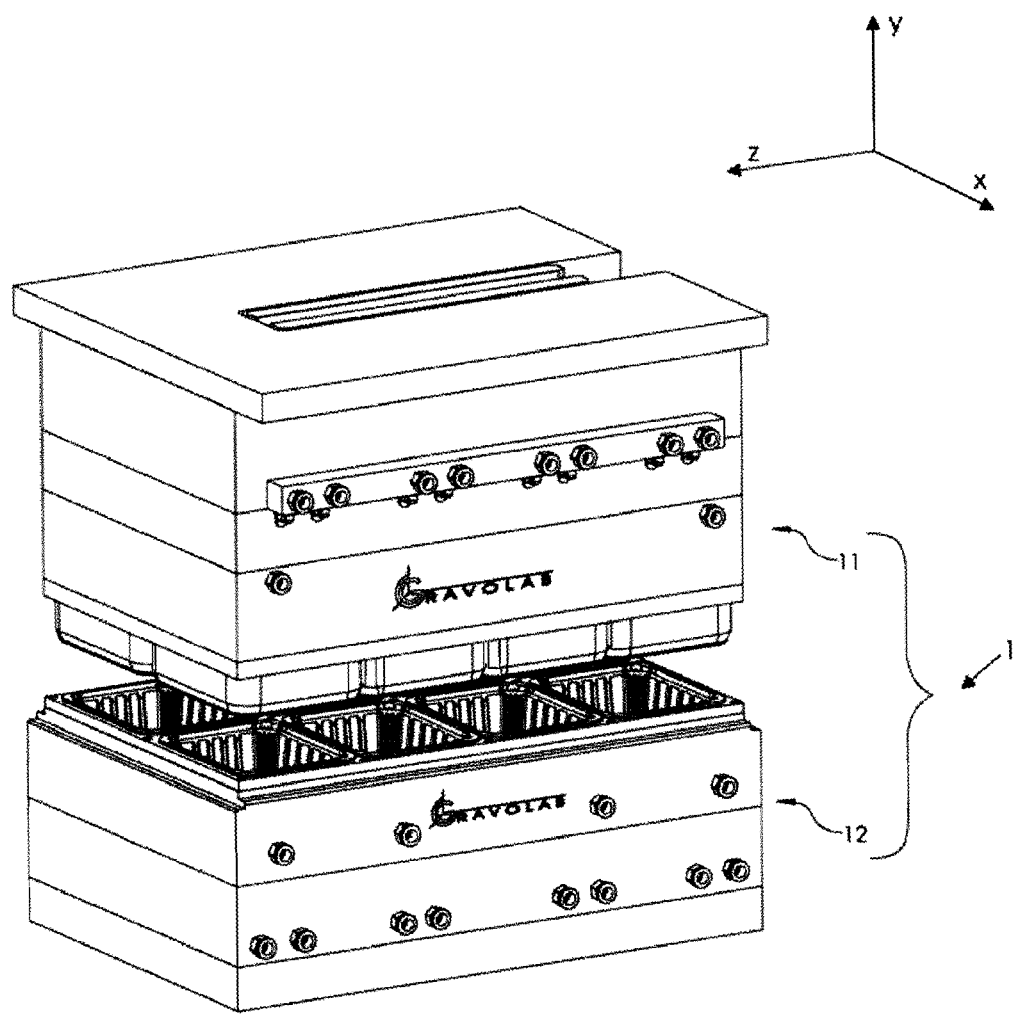
FIG. 21 depicts a perspective view of an embodiment of a In-Mould-Cut mould comprising CNC dies or forged dies in accordance with the present invention.

In a In-Mould-Cut thermoforming mould, according to the present invention, the plurality of common-edge cut dies (131, 132) are grouped into a plurality of fixed die assemblies (15) arranged in an x-z array on a top base plate (4) of the upper tool (11) (FIG. 19b). If the fixed dies assemblies (15) are CNC dies (132) or forged dies (132), each fixed die assembly (15) will represent an independent pressure box. The seal is made between the fixed die (15) and the thermoplastic sheet (3) during forming—the fixed die (15) penetrates only 30-70% of the thermoplastic sheet (3) thickness (A). After completion of the forming stage, the fixed die (15) is moved further toward the fourth zone (92d), preferably made from hardened stainless steel having a hardness of about 55-64 HRC, more preferably of about 60-62 HRC, and penetrates through the entire thickness (A) of the thermoplastic sheet (3) to sever said adjacent plastic products (2). If the fixed dies assemblies (15) are steel-rule dies (131) then, a pressure box will be mounted on the upper tool (11) via O-ring seals which will compensate for the supplementary applied cutting force. This supplementary applied cutting force relates to the force applied in order to close the distance between the lower tool (12) and upper tool (11) beyond the threshold to which they have sealed (in the forming stage). When the mould (1) is closed, the forming pressurized air, forces the pressure box up, in an open position of the mould (1). This force is compensated by the O-ring seals. The O-ring seals also provide for the sealing needed during the cutting operation. The pressure box is guided by means of, for example, rods with a detent plate assembly or screws with thresholds.

The reason why the pressure box is mounted on the In-Mould-Cut thermoforming mould having steel-rule dies (131) is that these steel-rule dies (131) have no lateral stiffness (they are very thin) and the forming pressure must be directed on both sides of this steel-rule die (131) to avoid its bending during the thermoforming process.

The fourth zone (92d) made from hardened stainless steel having a hardness of about 55-64 HRC, more preferably of about 60-62 HRC is preferred because of its corrosion and wear resistance and extremely high hardness with excellent toughness. It is advisable to use this type of steel for the manufacturing of the fourth zone (92d) of the supporting block (92) according to the present invention, both for the cutting station of a Form/Cut/Stack thermoforming mould and for a In-Mould-Cut thermoforming mould.

In a In-Mould-Cut thermoforming mould according to the present invention, the precision of alignment of the common-edge cut dies (131, 132) relative to the thermoformed products (2) is considerably higher compared to the precision of alignment of the common-edge cut dies (131, 132) relative to the cavities (8) in a cutting station of a Form/Cut/Stack thermoforming mould according to the present invention, respectively of about 0.02-0.08 mm. This precision is achieved by simply aligning the lower tool (12) and upper tool (11). One of the reasons why in a cutting station of a Form/Cut/Stack thermoforming mould, a larger secondary flange (B) of a formed plastic product (2) is needed is related to the cutting tolerances. Also, in a Form/Cut/Stack thermoforming mould the cutting precision depends on the positioning precision of the auto centering plugs (44) of the cutting station, relative to the thermoformed plastic sheet (3), which may suffer deformations both in the transport direction (x) and in a direction (z) perpendicular to said transport direction (x) in the same horizontal plane.

What has been described and illustrated herein is an example of the disclosure along with some of its optional features. The terms, descriptions and figures used herein are set forth by way of illustration only and are not meant as limitations. The scope of the disclosure is intended to be defined by the following claims.

The invention claimed is:

1. A multi-cavity mould (1) for a thermoforming machine used in the process of high-volume, continuous thermoforming of a plurality of thin-gauge plastic products (2) from a preheated thin-gauge thermoplastic sheet (3) comprising:
   an upper tool (11) and a lower tool (12) arranged in a cooperating manner; the lower tool (12) comprising:
      a plurality of cavities (8) in which cavity moulds (8') may be placed and
      a plurality of base plates (91) from which a plurality of supporting blocks (92) extend perpendicularly over a predetermined total height (a), situated between adjacent cavities (8),
   characterized in that
   each of said supporting block (92) has a stepped profile comprising a first (92a), a second (92b), a third (92c) substantially rectangular shaped zones in a vertical cross section and a substantially isosceles trapezoid shaped fourth zone (92d) in a vertical cross section, having a common symmetry axis in a vertical cross section through a plane perpendicular to said base plate (91) wherein:
      said first zone (92a) extends perpendicularly from said base plate (91) over a distance (a1) calculated as 17-50% of the total height (a) of said supporting block (92) and the width of the first zone (92a) is calculated as 24-60% of the total height (a) of said supporting block (92);
      said second zone (92b) extends in continuation of said first zone (92a) over a distance (a2) calculated as 45-65% of the total height (a) of said supporting block (92) and the width of the second zone (92b) is calculated as 7-16% of the total height (a) of said supporting block (92);
      said third zone (92c) extends in continuation of said second zone (92b) over a distance (a3) calculated as 9-12% of the total height (a) of said supporting block (92) and the width of the third zone (92c) is calculated as 5-10% of the total height (a) of said supporting block (92);
      said substantially isosceles trapezoid shaped fourth zone (92d) extends in continuation of said third zone (92c) over a distance (a4) calculated as 9-12% of the total height (a) of said supporting block (92), wherein the fourth zone (92d) has a bottom base in contact with and having the same width as the third zone (92c), a top base and two legs of equal length between the top and bottom bases, and the width of the top base of said fourth zone (92d) is calculated as 2.5-5% of the total height (a) of said supporting block (92).

2. A multi-cavity mould (1) according to claim 1, wherein each of a set of acute base angles of said fourth zone (92d) is between about 75° and about 89°.

3. A multi-cavity mould (1) according to claim 1, wherein the upper tool (11) and the lower tool (12) are being operable to simultaneously form a plurality of thin-gauge plastic products (2) in corresponding cavity moulds (8') arranged inside the cavities (8) of said lower tool (12) in an x-z array, the upper tool (11) comprising:
   a top base plate (4) and
   a plurality of plug moulds (5) arranged in an x-z array and connected in a translational manner to said top base plate (4) by means of driving rods (6) such that said plug moulds (5) are movable in a direction (y) perpendicular to a transport direction (x) of said preheated thin-gauge thermoplastic sheet (3) and said lower tool (12) further comprising:
   a bottom base plate (7) connected to said plurality of base plates (91) via spacer blocks (71);
   a plurality of mobile plates (72) connected in a translational manner to said bottom base plate (7) and movable in the direction (y) perpendicular to the transport direction (x) of said preheated thin-gauge thermoplastic sheet (3);
   a plurality of mould inserts (10) for matching a corresponding cavity mould's (8') model
   wherein in said lower tool (12):
      the legs and top base of said fourth zone (92d) are spaced apart from a top part of adjacent cavity moulds (8') at predetermined distances (d1, d2);
      top rims of two adjacent cavity moulds (8') extend over a part of the top base of the fourth zone (92d) of the supporting block (92) situated between them, leaving a middle portion of the top base uncovered, with a width (D) of about 1.5 mm to about 6 mm.

4. A multi-cavity mould (1) according to claim 3 wherein said plurality of mould inserts (10) comprises a plurality of additional support means (101) placed on exterior top surfaces of said mould inserts (10), said surfaces contacting said cavity mould's (8') inner walls and said additional support means (101) being Polytetrafluoroethylene (PTFE) pads.

5. A multi-cavity mould (1) according to claim 1, wherein the upper tool (11) and the lower tool (12) are being operable to simultaneously sever a plurality of formed thin-gauge plastic products (2) from said thermoplastic sheet (3) by moving said upper tool (11) and lower tool (12) towards each other in a direction (y) perpendicular to a transport direction (x) of said thin-gauge thermoplastic sheet (3), wherein:
   the top base of the fourth zone (92d) has a middle portion with a width (D) of about 1.5 mm to about 6 mm such that, when formed plastic products (2), connected to each other by a common edge, are placed in the cavities (8), said common edge falls within the middle portion; and
   the upper tool (11) comprises a plurality of common-edge cut dies (131, 132) arranged to sever, said adjacent formed plastic products (2) on said common edge, in order to obtain finished thin-gauge plastic products (2).

6. A multi-cavity mould (1) according to claim 5 wherein said plurality of common-edge cut dies (131, 132) are steel-rule dies (131), CNC dies (132) or forged dies (132).

7. A multi-cavity mould (1) according to claim 5 wherein in the lower tool (12) the plurality of base plates (91) are connected to each other to form a continuous base plate (91).

8. A multi-cavity mould (1) according to claim 5 wherein said common edges are arranged in the transport direction (x) and/or in a direction (z) perpendicular to said transport direction (x) in the same horizontal plane.

9. A multi-cavity mould (1) according to claim 5 wherein said width (D) of the middle portion is about 2 to 4 mm.

10. A multi-cavity mould (1) according to claim 5 wherein said plurality of common-edge cut dies (131, 132) are grouped into a plurality of floating die assemblies (13) arranged in an x-z array on a supporting base (42) and connected to a top base plate (4) of said upper tool (11) by means of a plurality of guiding means (14) and wherein each of said floating die assembly (13) further comprises:
  a die holder (43) connected to said supporting base (42) such that said common-edge cut die (131, 132) from the plurality of common-edge cut dies (131, 132) is connected to both said supporting base (42) and said die holder (43) and
  an assembly of auto centering plugs (44) arranged on the die holder (43) and configured to align said common-edge cut die (131, 132) on said common edge between adjacent formed plastic products (2).

11. A multi-cavity mould (1) according to claim 10 wherein said plurality of guiding means (14) is a plurality of bushing guides (14) with a relative movement, in the horizontal (x-z) plane of said plurality of floating die assemblies (13), of about 1 to 3 mm.

12. A multi-cavity mould (1) according to claim 10 wherein between said top base plate (4) and said die holder (43), a plurality of resilient means (41) is provided, wherein said plurality of resilient means (41) is a plurality of extension springs (41) made of stainless steel.

13. A Form/Cut/Stack thermoforming apparatus comprising a first multi-cavity mould (1) according to claim 3 as a forming station arranged to simultaneously form the plurality of thing-gauge plastic products (2) from the thermoplastic sheet (3), wherein said substantially isosceles trapezoid shaped fourth zone (92d) and said third zone (92c) are made from the same material, an Aluminum alloy selected from a group consisting of 5083, 6082 and 7075 Aluminum alloys, and
  a second multi-cavity mould (1) according to claim 5 as a cutting station arranged to sever the plurality of formed thin-gauge plastic products (2) from the thermoplastic sheet (3), wherein the second multi-cavity mould comprises a substantially isosceles trapezoid shaped fourth zone (92d) made from hardened stainless steel with a hardness of about 55-64 HRC.

14. A thermoforming apparatus according to claim 13 wherein between the common-edge cut dies (131, 132) and the preheated thermoplastic sheet (3) placed on adjacent cavity moulds (8') or adjacent cavities (8), a clearance space (d) is provided, having a size of 0.3 to 1.1 mm.

15. An In-Mould-Cut thermoforming apparatus wherein a multi-cavity mould (1) according to claim 3 comprises a plurality of common-edge cut dies (131, 132) on the upper tool (11), arranged in a single station to form and subsequently sever said adjacent plastic products (2) by moving said upper tool (11) and lower tool (12) toward each other in a direction (y) perpendicular to a transport direction (x) of said thin-gauge thermoplastic sheet (3), wherein:
  the top base of the fourth zone (92d) has a middle portion with a width (D) of about 1.5 mm to about 6 mm such that, when formed plastic products (2), connected to each other by a common edge, are placed in the cavities (8), said common edge falls within the middle portion; and
  the plurality of common-edge cut dies (131, 132) are arranged to sever said formed plastic products (2) on said common edge, in order to obtain finished thin-gauge plastic products (2); and wherein:
  said substantially isosceles trapezoid shaped fourth zone (92d) is made from hardened stainless steel having a hardness of about 55-64 HRC, and
  said plurality of common-edge cut dies (131, 132) are grouped into a plurality of fixed die assemblies (15) arranged in an x-z array on a top base plate (4) of said upper tool (11).

* * * * *